US 9,778,469 B2

(12) United States Patent
Kimura et al.

(10) Patent No.: US 9,778,469 B2
(45) Date of Patent: Oct. 3, 2017

(54) HEAD-MOUNTED DISPLAY DEVICE AND CONTROL METHOD OF HEAD-MOUNTED DISPLAY DEVICE

(71) Applicant: SEIKO EPSON CORPORATION, Tokyo (JP)

(72) Inventors: Fusashi Kimura, Matsumoto (JP); Atsunari Tsuda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 55 days.

(21) Appl. No.: 14/894,786

(22) PCT Filed: Jun. 5, 2014

(86) PCT No.: PCT/JP2014/002986
§ 371 (c)(1),
(2) Date: Nov. 30, 2015

(87) PCT Pub. No.: WO2014/199598
PCT Pub. Date: Dec. 18, 2014

(65) Prior Publication Data
US 2016/0103326 A1    Apr. 14, 2016

(30) Foreign Application Priority Data

Jun. 12, 2013    (JP) .................. 2013-123302

(51) Int. Cl.
*G09G 5/10*    (2006.01)
*G02B 27/01*    (2006.01)
*G06T 19/00*    (2011.01)

(52) U.S. Cl.
CPC ....... *G02B 27/0179* (2013.01); *G02B 27/017* (2013.01); *G02B 27/0172* (2013.01);
(Continued)

(58) Field of Classification Search
CPC combination set(s) only.
See application file for complete search history.

(56) References Cited

U.S. PATENT DOCUMENTS 5,768,386 A    6/1998    Yokomoto et al.
6,111,597 A    8/2000    Tabata
(Continued)

FOREIGN PATENT DOCUMENTS

JP    H07-275286 A    10/1995
JP    H07-302063 A    11/1995
(Continued)

OTHER PUBLICATIONS

Dec. 4, 2014 Search Report issued in International Patent Application No. PCT/JP2014/002986.

*Primary Examiner* — Jennifer Mehmood
*Assistant Examiner* — Sosina Abebe
(74) *Attorney, Agent, or Firm* — Oliff PLC

(57) ABSTRACT

A head-mounted display device includes an image processing unit that controls a display drive units. The image processing unit controls the pair of display drive units so as to move the emission areas in any one of a first direction in which an image formed by the image light emitted from one of the display drive units and an image formed by the image light emitted from the other of the display drive units move close to each other in cooperation and a second direction in which an image formed by the image light emitted from one of the display drive units and an image formed by the image light emitted from the other of the display drive units move apart from each other in cooperation to change a focal distance of an image in a virtual image which is visually recognized by the user.

11 Claims, 14 Drawing Sheets

(52) U.S. Cl.
CPC ............ *G06T 19/006* (2013.01); *G09G 5/10* (2013.01); *G02B 2027/014* (2013.01); *G02B 2027/0127* (2013.01); *G02B 2027/0178* (2013.01); *G02B 2027/0185* (2013.01); *G02B 2027/0187* (2013.01)

(56) References Cited

U.S. PATENT DOCUMENTS

| | | |
|---|---|---|
| 6,545,650 B1 | 4/2003 | Yamada et al. |
| 2012/0320100 A1 | 12/2012 | Machida et al. |
| 2013/0113973 A1* | 5/2013 | Miao ................. G09G 3/003 348/333.01 |
| 2014/0225919 A1 | 8/2014 | Kaino et al. |
| 2016/0133057 A1 | 5/2016 | Kaino et al. |
| 2016/0133058 A1 | 5/2016 | Kaino et al. |
| 2016/0167672 A1* | 6/2016 | Krueger ............... A61M 21/00 340/576 |

FOREIGN PATENT DOCUMENTS

| | | |
|---|---|---|
| JP | H08-211332 A | 8/1996 |
| JP | H10-262165 A | 9/1998 |
| JP | H11-202256 A | 7/1999 |
| JP | 2000-013818 A | 1/2000 |
| JP | 2006-185448 A | 7/2006 |
| JP | 2006-185449 A | 7/2006 |
| JP | 2012-165085 A | 8/2012 |
| JP | 2013-092964 A | 5/2013 |

\* cited by examiner

[Fig. 1]
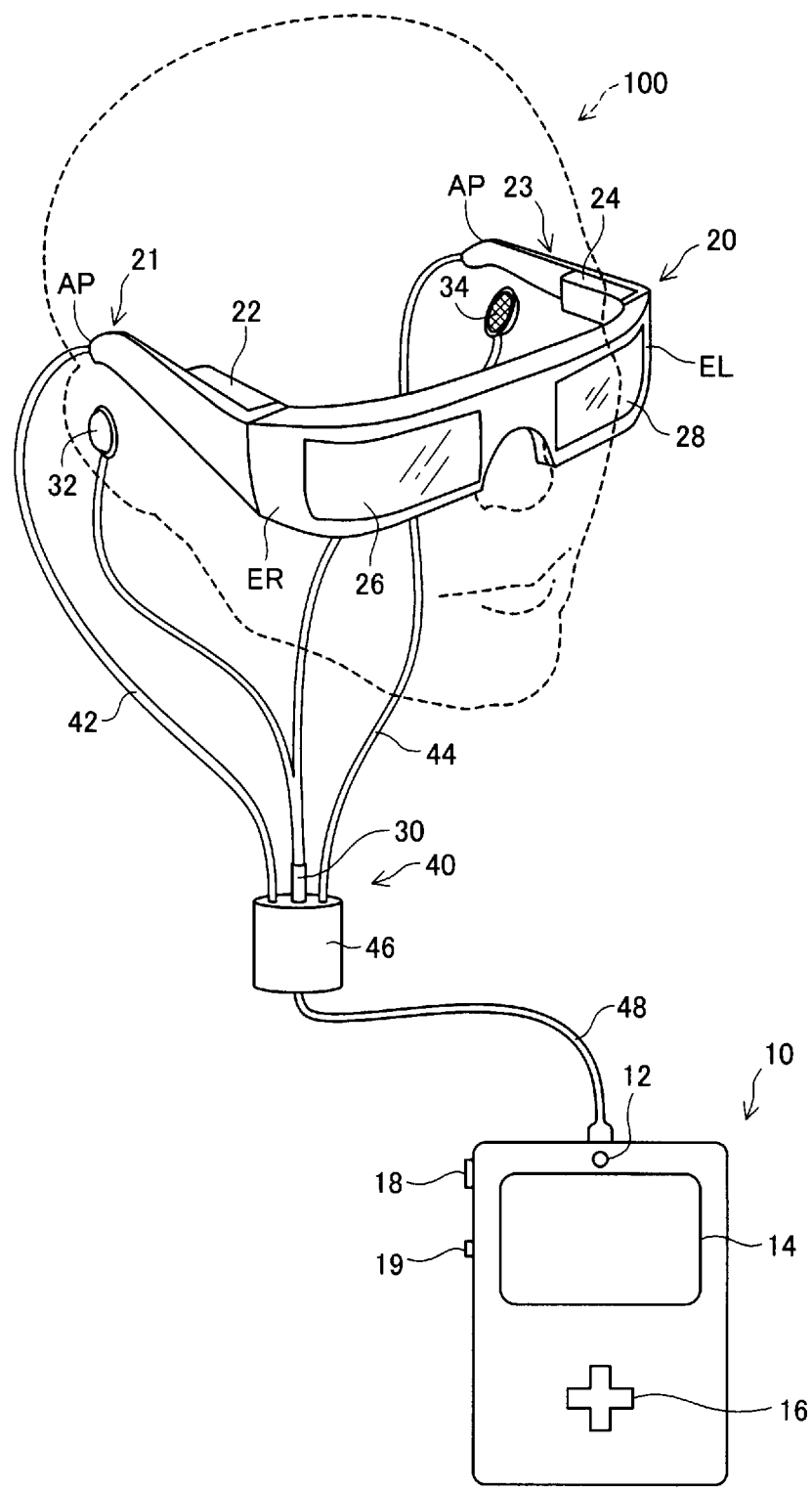

[Fig. 2]
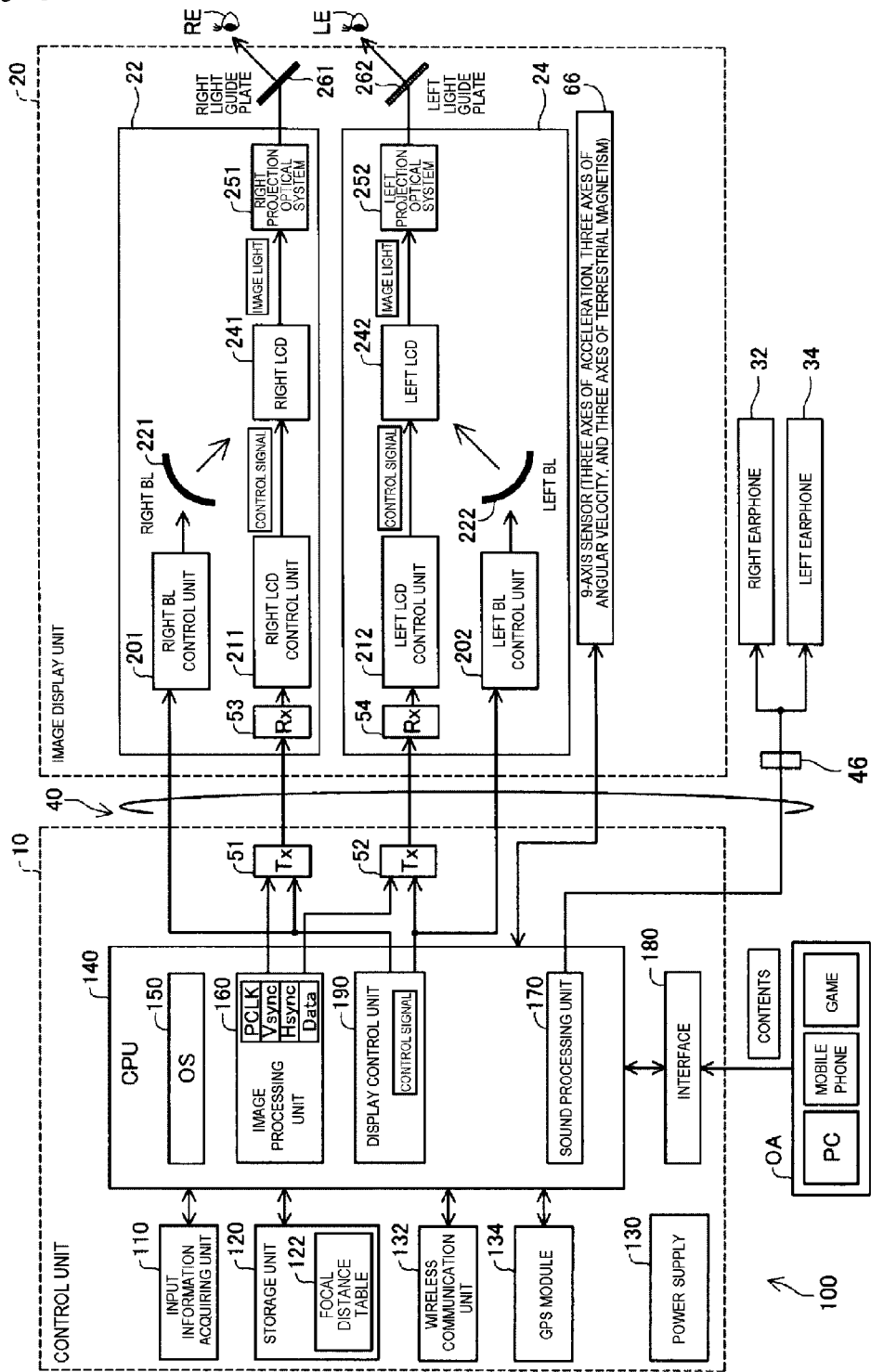

[Fig. 3]
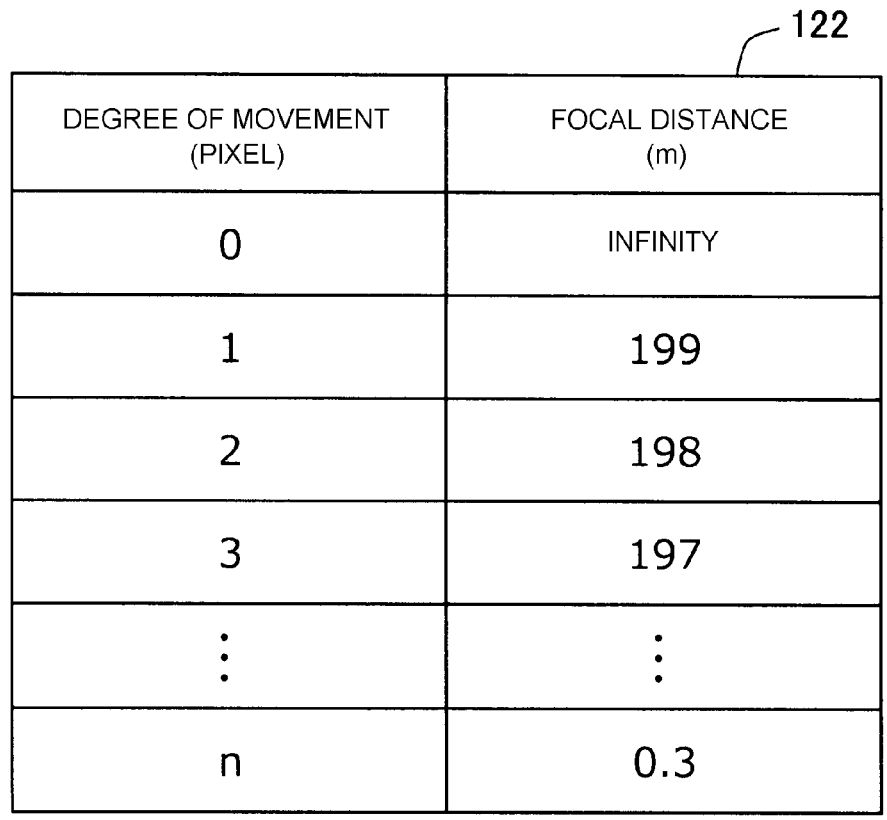
[Fig. 4]
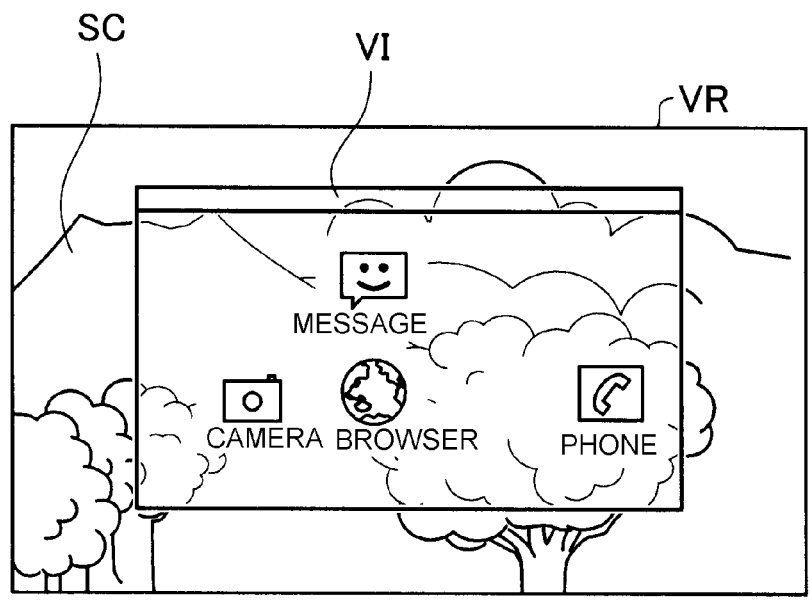

[Fig. 5]
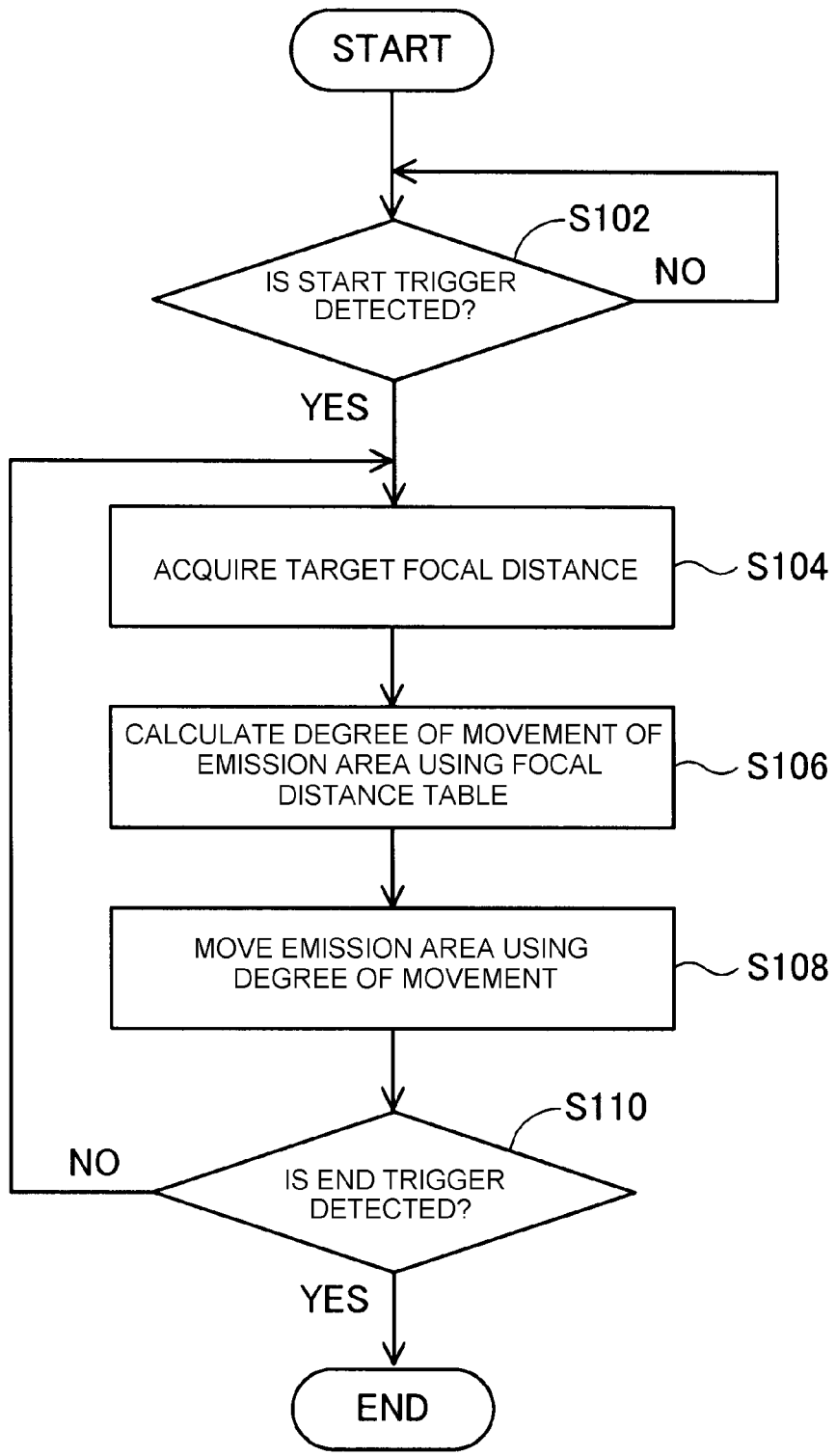

[Fig. 6]
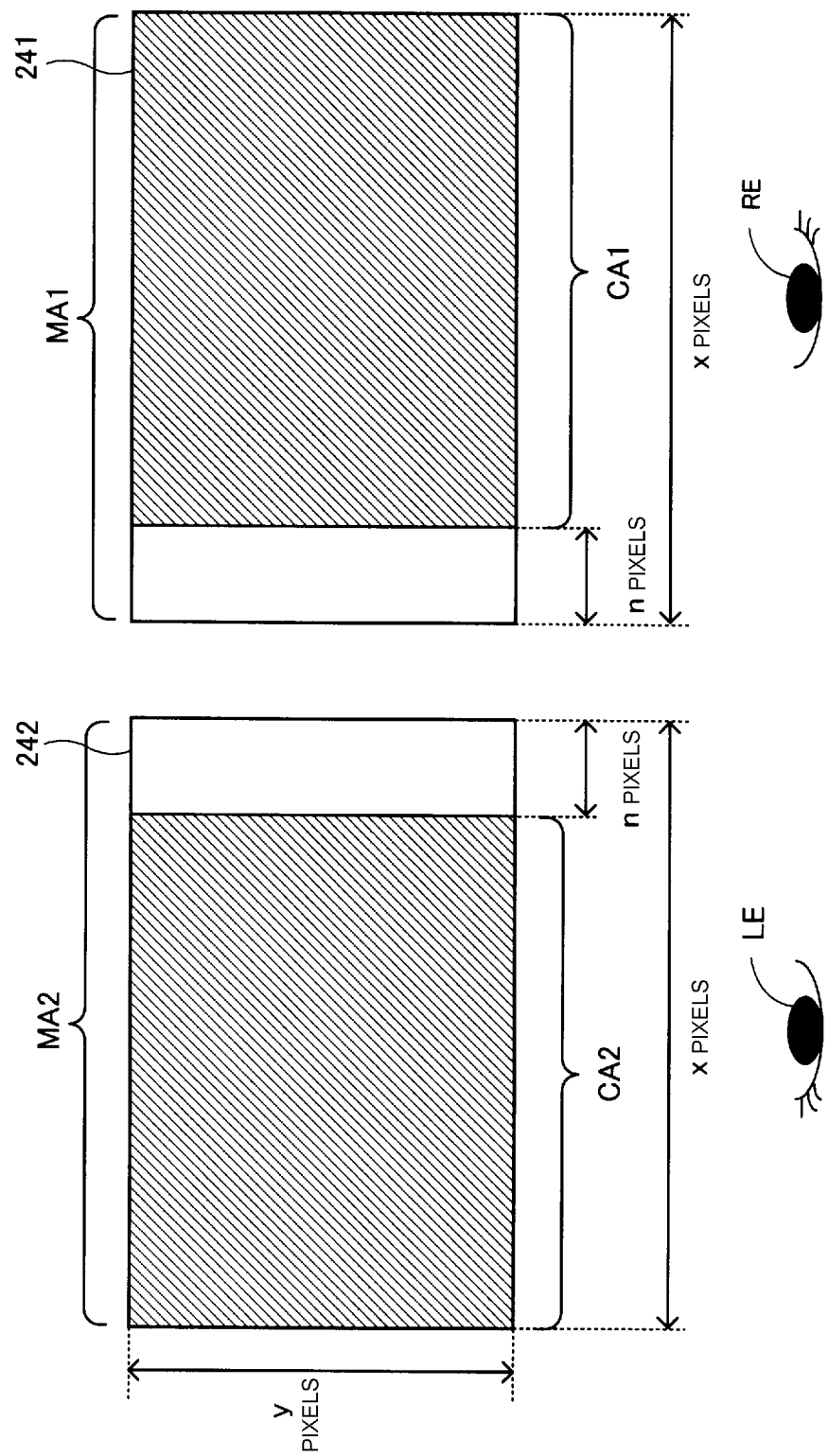

[Fig. 7]
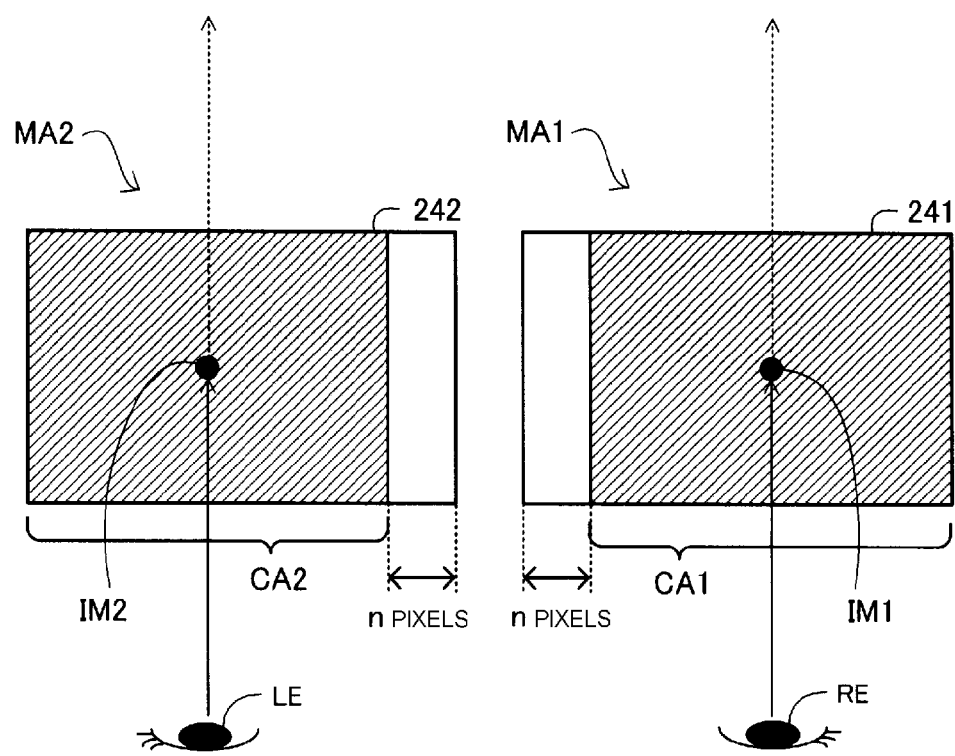

[Fig. 8]
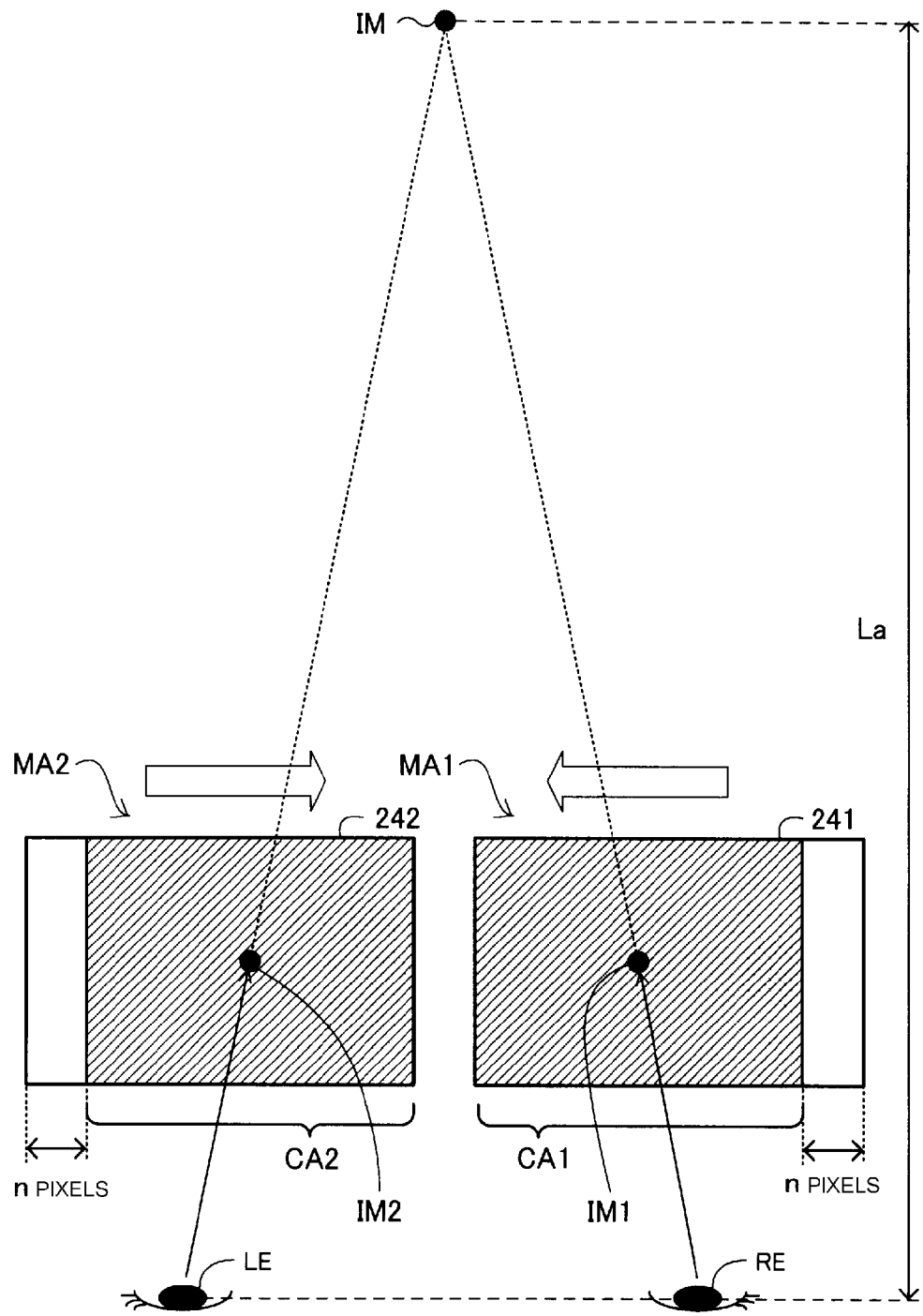

[Fig. 9]
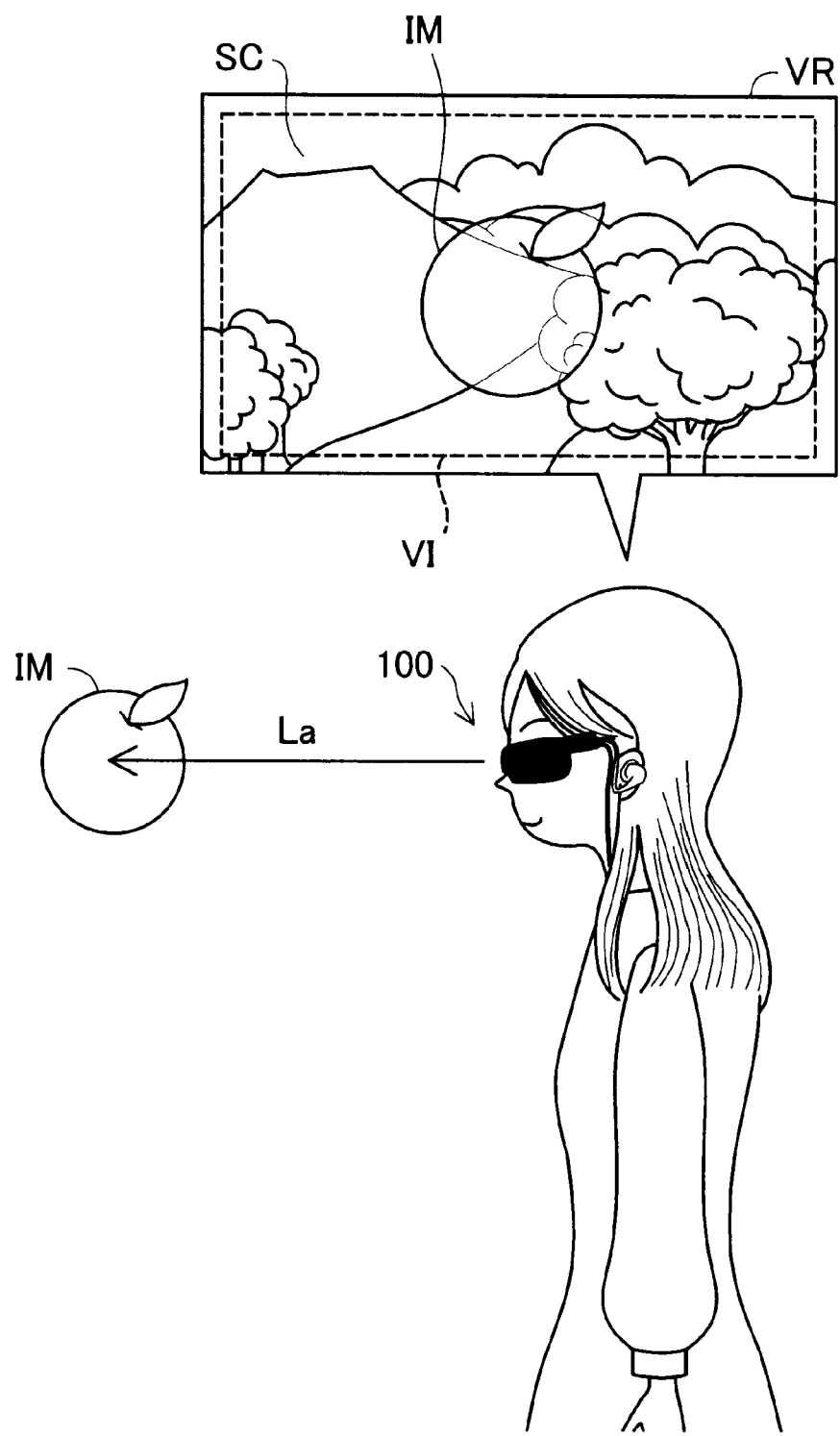

[Fig. 10]
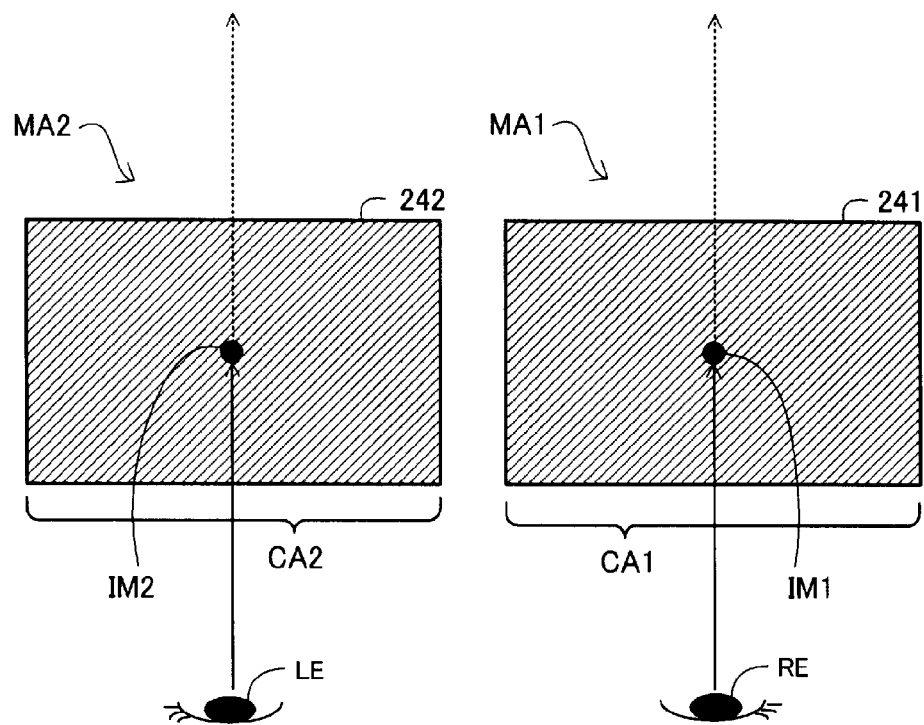

[Fig. 11]
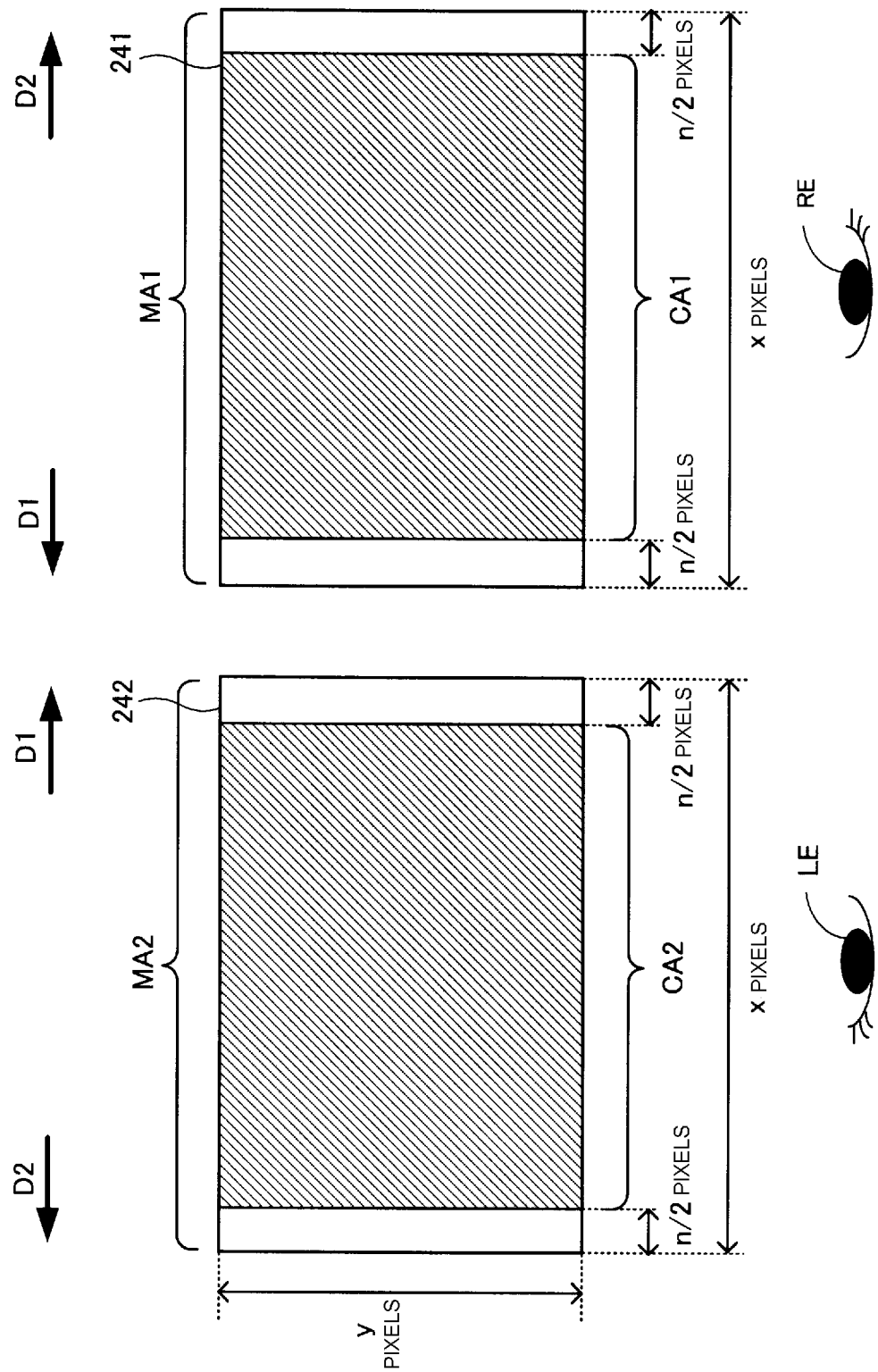

[Fig. 12]
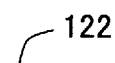
| DEGREE OF MOVEMENT (PIXEL) | FOCAL DISTANCE (m) |
|---|---|
| -n/2 | INFINITY |
| ⋮ | ⋮ |
| -2 | 97 |
| -1 | 96 |
| 0 | 95 |
| 1 | 94 |
| 2 | 93 |
| ⋮ | ⋮ |
| n/2 | 1 |

[Fig. 13]
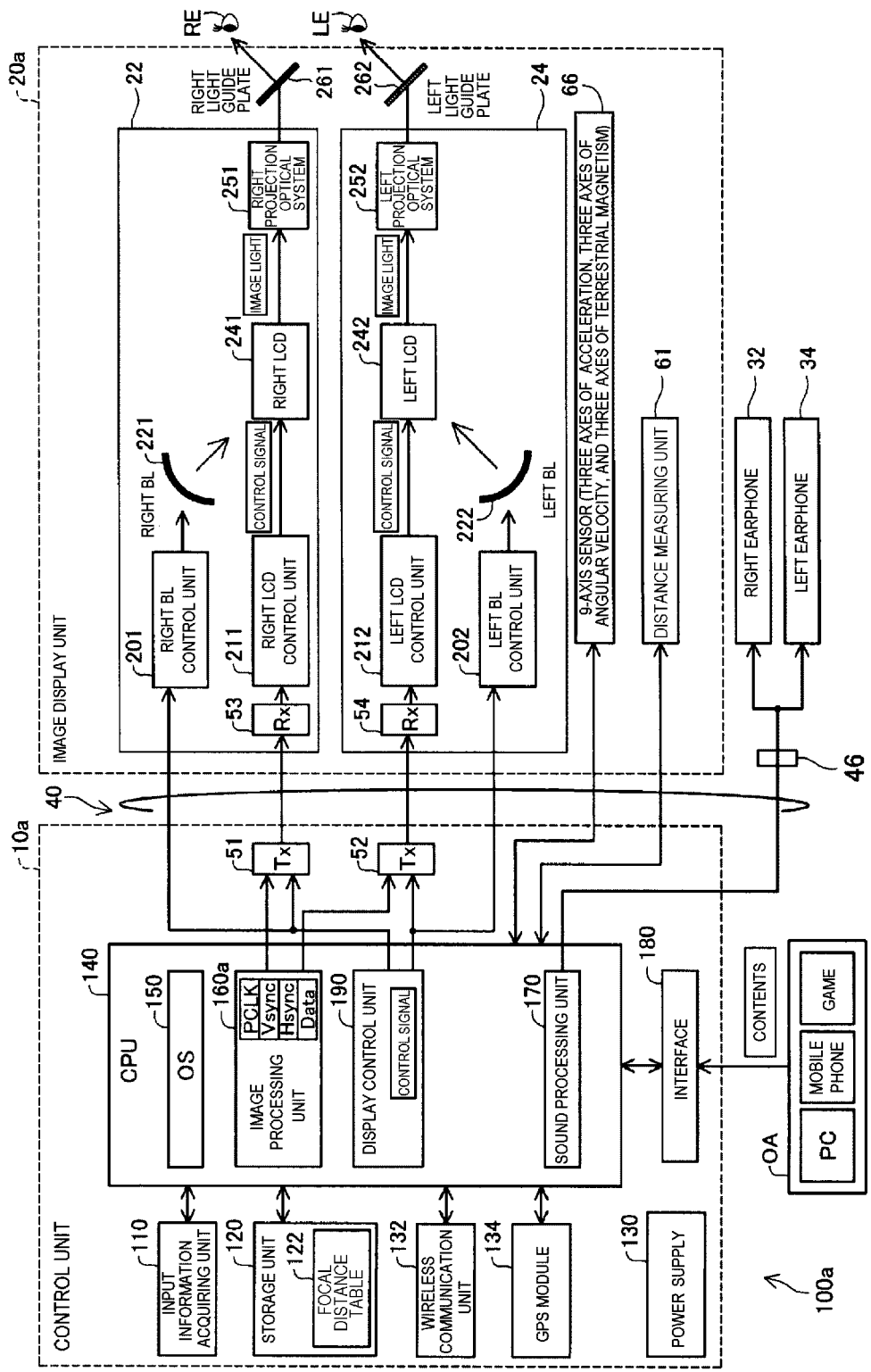

[Fig. 14]
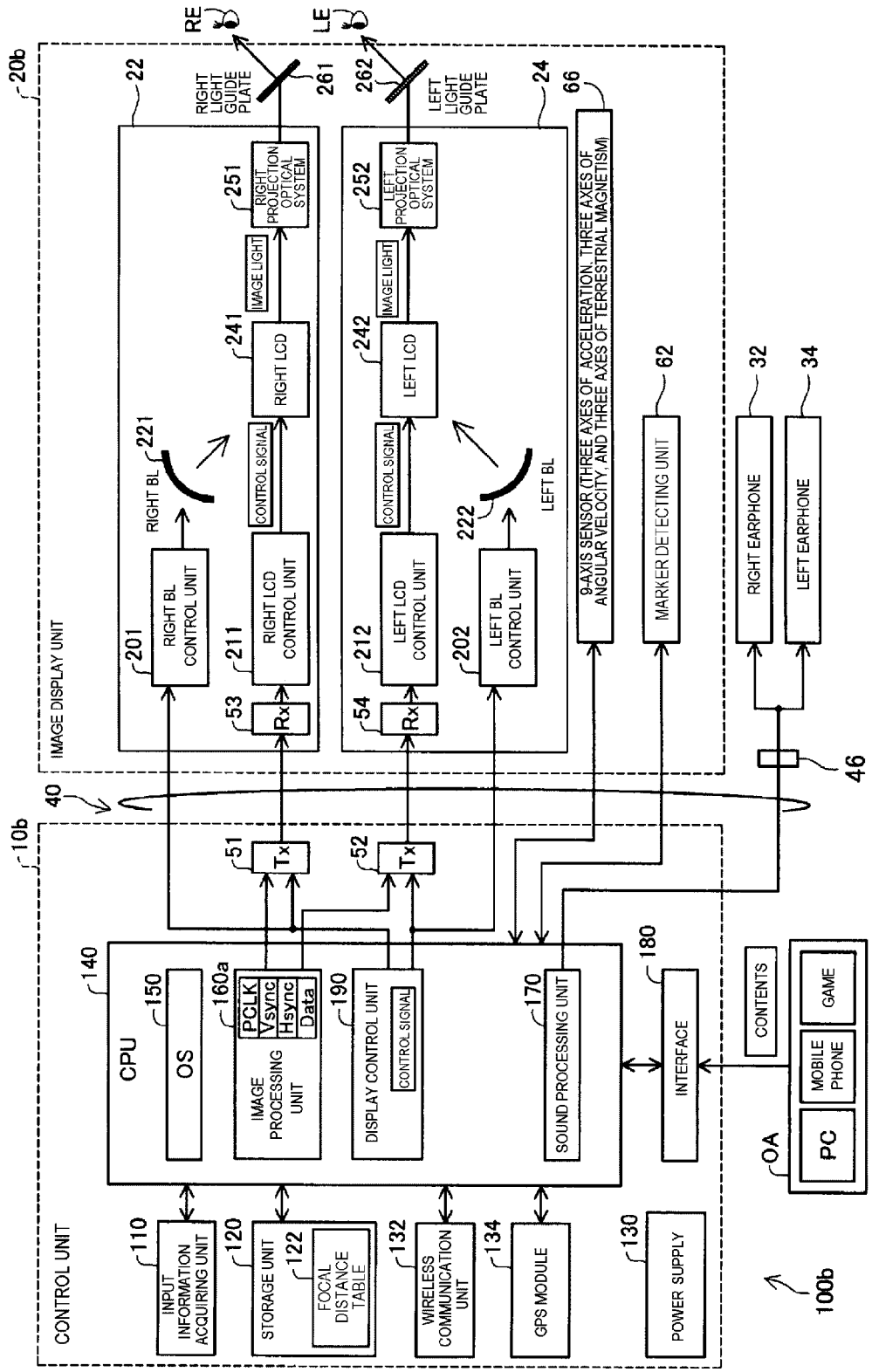

[Fig. 15A]
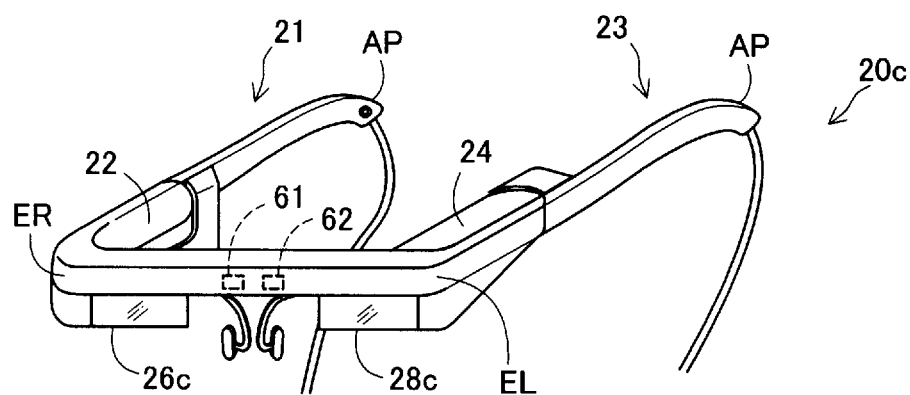
[Fig. 15B]
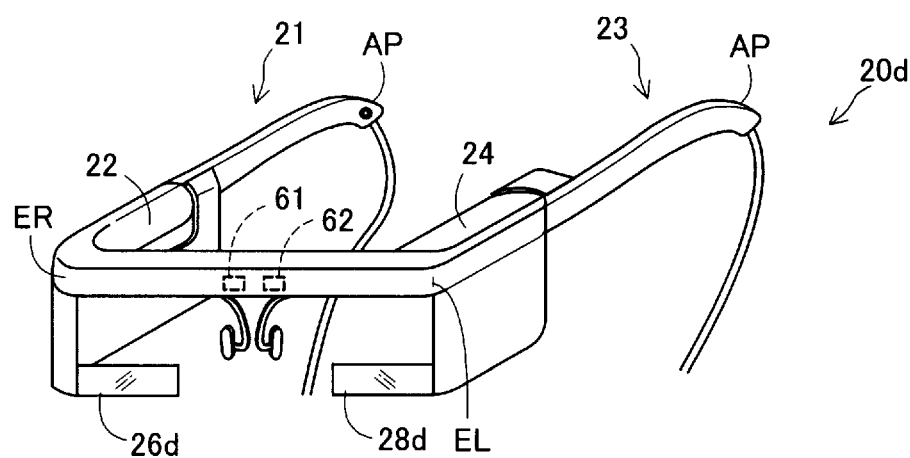

HEAD-MOUNTED DISPLAY DEVICE AND CONTROL METHOD OF HEAD-MOUNTED DISPLAY DEVICE

TECHNICAL FIELD

The present invention relates to a head-mounted display device.

BACKGROUND ART

A head-mounted display device (HMD) which is a display device mounted on a head is known. The head-mounted display device allows a user to recognize a virtual image, for example, by generating image light indicating an image using a liquid crystal display and a light source and guiding the generated image light to the user's eyes using a projection optical system, a light guide plate, or the like.

PTL 1 describes a technique capable of displaying a virtual image at a distance on which a user's eyes are focused in such a head-mounted display device. In the technique described in PTL 1, a sensor senses sight lines of a user's right and left eyes and virtual image distance control means controls movement of display panels corresponding to the user's right and left eyes on the basis of the directions of the sensed sight lines. Accordingly, in the technique described in PTL 1, it is possible to change a focal distance of an image in a virtual image which is visually recognized by the user.

CITATION LIST

Patent Literature

PTL 1: JP-A-10-262165

SUMMARY OF INVENTION

Technical Problem

In the technique described in PTL 1, the changing of the focal distance of an image is implemented by mechanically moving the display panels corresponding to the user's right and left eyes. Accordingly, there is a problem in that a configuration for moving the display panels is required, thereby causing an increase in size and weight of the head-mounted display device and an increase in cost thereof. Therefore, there is a need for a technique capable of changing a focal distance of an image in a virtual image which is visually recognized by a user without mechanically moving constituent members of the head-mounted display device.

Solution to Problem

An advantage of some aspects of the invention is to solve at least a part of the problems described above, and the invention can be implemented as the following forms.

(1) An aspect of the invention is directed to a head-mounted display device that enables a user to simultaneously visually recognize a virtual image and an external scene. The head-mounted display device includes: a pair of display drive units that generates and emits image light representing an image; and an image processing unit that controls the display drive units so as to emit the image light from emission areas of the display drive units, wherein the image processing unit controls the pair of display drive units so as to move the emission areas in any one of a first direction in which an image formed by the image light emitted from one of the display drive units and an image formed by the image light emitted from the other of the display drive units move close to each other in cooperation and a second direction in which an image formed by the image light emitted from one of the display drive units and an image formed by the image light emitted from the other of the display drive units move apart from each other in cooperation to change a focal distance of an image in a virtual image which is visually recognized by the user. According to the head-mounted display device, the image processing unit changes the focal distance of an image in the virtual image which is visually recognized by the user by controlling the pair of display drive units so as to move the emission areas in any one of a first direction in which an image formed by the image light emitted from one of the display drive units and an image formed by the image light emitted from the other of the display drive units move close to each other in cooperation and a second direction in which an image formed by the image light emitted from one of the display drive units and an image formed by the image light emitted from the other of the display drive units move apart from each other in cooperation. Accordingly, it is possible to achieve the same result as mechanical moving display elements (for example, display panels) corresponding to the user's right and left eyes without mechanically moving constituent members of the head-mounted display device. As a result, according to the head-mounted display device according to this aspect, it is possible to change the focal distance of an image in a virtual image which is visually recognized by a user without mechanically moving constituent members of the head-mounted display device.

(2) In the head-mounted display device, the emission area may be an area smaller in a horizontal direction than a reference area which is an area used to emit the image light by the display drive units. According to the head-mounted display device with this configuration, it is possible to set the emission area to be smaller in the horizontal direction than the reference area.

(3) In the head-mounted display device, the image processing unit may control the pair of display drive units so as to move the emission areas in the first direction to change the focal distance of the image in the virtual image which is visually recognized by the user. According to the head-mounted display device with this configuration, the image processing unit controls the pair of display drive units so as to move the emission areas in the first direction in which both images move close to each other in cooperation to change the focal distance of the image in the virtual image which is visually recognized by the user. As a result, it is possible to change a convergence angle of the right eye and the left eye of the user with respect to the image appearing in the virtual image and thus the user can recognize depth.

(4) In the head-mounted display device, the image processing unit may acquire a target value of the focal distance, may calculate a degree of movement of the emission areas from the acquired target value, and may move the emission area of the one display drive unit and the emission area of the other display drive unit on the basis of the calculated degree of movement. According to the head-mounted display device with this configuration, the image processing unit acquires the target value of the focal distance, calculates the degree of movement of the emission areas from the acquired target value, and moves the emission areas of the pair of display drive units on the basis of the calculated degree of movement. In the pair of display drive units, when an image formed by the image light emitted from the one display drive unit and an image formed by the image light emitted from the other display drive unit move close to each other in cooperation, the convergence angle of the right eye and the left eye of the user with respect to the image formed by both of the image light increases. That is, the user can recognize an image from nearby. Therefore, the image processing unit can change the focal distance of the image on the basis of the target value of the focal distance.

(5) The head-mounted display device may further include a distance measuring unit that measures a distance from the user to an object present in front of the user's eyes, and the image processing unit may acquire the measured distance as the target value. According to the head-mounted display device with this configuration, the image processing unit can change the focal distance of the image depending on the distance to an object present in front of the user's eyes.

(6) The head-mounted display device may further include a sight line detecting unit that detects a direction of the user's sight line, and the distance measuring unit may measure a distance to the object present in the direction of the detected sight line. According to the head-mounted display device with this configuration, the image processing unit can change the focal distance of an image using the distance to an object present in the direction of the user's sight line.

(7) The head-mounted display device may further include a marker detecting unit that detects a predetermined marker present in front of the user's eyes, and the image processing unit may change the focal distance of the image when the predetermined marker is detected. According to the head-mounted display device with this configuration, the image processing unit can change the focal distance of an image only when a predetermined marker is present in front of the user's eyes.

(8) In the head-mounted display device, the image processing unit may control the pair of display drive units so as to set the emission area of the one display drive unit to a right end of the reference area and to set the emission area of the other display drive unit to a left end of the reference area to set the focal distance of the image in the virtual image which is visually recognized by the user to infinity. According to the head-mounted display device with this configuration, the image processing unit sets the emission area of the one display drive unit to the right end of the reference area and sets the emission area of the other display drive unit to the left end of the reference area. In this way, when the emission areas of the display drive units are set to right and left ends of the reference areas in a state where the focal distance of an image is set to infinity, that is, in a parallel viewing state where right and left images are displayed at positions at which both eyes of the user directly stare at the front side in parallel, the image processing unit can effectively use the entire reference area and thus to change the convergence angle between the image and the user's eyes.

(9) In the head-mounted display device, the image processing unit may control the pair of display drive units so as to set a size of the emission area to the same size of the reference area and to set the emission areas of the pair of display drive units to the center of the reference area to set the focal distance of the image in the virtual image which is visually recognized by the user to infinity. According to the head-mounted display device with this configuration, the image processing unit controls the display drive unit so as to set the size of the emission areas to the same size as the reference areas. Accordingly, the image processing unit can increase the size of an image to be displayed as virtual image in a state where the focal distance of an image is set to infinity, that is, in a parallel viewing state where right and left images are displayed at positions at which both eyes of the user directly stare at the front side in parallel.

Not all the elements in the aspects of the invention are essential. In order to solve all or a part of the above-mentioned problems or to achieve all or a part of the effects described in this specification, some elements may be appropriately subjected to change, deletion, replacement with new elements, and partial deletion of defined details. In order to solve all or a part of the above-mentioned problems or to achieve all or a part of the effects described in this specification, all or a part of technical features included in one aspect of the invention may be combined with all or a part of technical features included in another aspect of the invention to constitute an independent aspect of the invention.

For example, an aspect of the invention may be embodied as a device including one or both of the display drive unit and the image processing unit. That is, this device may have or may not have the display drive unit. This device may have or may not have the image processing unit. This device can be embodied, for example, as a head-mounted display device, but may be embodied as another device other than the head-mounted display device. All or a part of the technical features in the above-mentioned aspects of the head-mounted display device can be applied to this device.

The invention can be embodied in various aspects and can be embodied, for example, in aspects such as a head-mounted display device, a control method of a head-mounted display device, a head-mounted display system, a computer program for performing the method or the functions of the device or system, and a recording medium having the computer program recorded thereon.

BRIEF DESCRIPTION OF DRAWINGS

FIG. 1 is a diagram schematically illustrating a configuration of a head-mounted display device according to an embodiment of the invention.

FIG. 2 is a block diagram illustrating a functional configuration of a head-mounted display.

FIG. 3 is a diagram illustrating an example of a focal distance table.

FIG. 4 is a diagram illustrating an example of a virtual image which is visually recognized by a user.

FIG. 5 is a flowchart illustrating a flow of a focal distance changing process.

FIG. 6 is a diagram illustrating a relationship between a size of a reference area of a display drive unit and a size of an emission area through which image light is actually emitted from the display drive unit.

FIG. 7 is a diagram illustrating an image formed by image light emitted from the display drive unit when the focal distance is infinity.

FIG. 8 is a diagram illustrating an image formed by image light emitted from the display drive unit when the focal distance is 0.3 m.

FIG. 9 is a diagram illustrating a virtual image which is visually recognized by a user when the focal distance is 0.3 m.

FIG. 10 is a diagram illustrating a first modification of the focal distance changing process.

FIG. 11 is a diagram illustrating a second modification of the focal distance changing process.

FIG. 12 is a diagram illustrating an example of a focal distance table used in the second modification of the focal distance changing process.

FIG. 13 is a block diagram illustrating a functional configuration of a head-mounted display according to a second embodiment.

FIG. 14 is a block diagram illustrating a functional configuration of a head-mounted display according to a third embodiment.

FIG. 15A is a diagram illustrating an outer configuration of a head-mounted distance according to a modification example.

FIG. 15B is a diagram illustrating an outer configuration of a head-mounted distance according to a modification example.

DESCRIPTION OF EMBODIMENTS

A. First Embodiment

A-1. Configuration of Head-Mounted Display Device

FIG. 1 is a diagram schematically illustrating a configuration of a head-mounted display device according to an embodiment of the invention. The head-mounted display device 100 is a display device mounted on a head and is also referred to as a head-mounted display (HMD). The head-mounted display 100 according to this embodiment is an optical transmissive head-mounted display device that enables a user to directly visually recognize an external scene at the same time as visually recognizing a virtual image and is a head-mounted display device that can change a focal distance of an image in a virtual image which is visually recognized by a user. In this embodiment, a "focal distance of an image in a virtual image which is visually recognized by a user" means a distance between both eyes of the user of the head-mounted display 100 and a position on which an image included in a virtual image which is visually recognized by the user is focused in use of the head-mounted display 100.

The head-mounted display 100 includes an image display unit 20 that allows a user to visually recognize a virtual image in a state where the user wears the head-mounted display and a control unit (controller) 10 that controls the image display unit 20.

The image display unit 20 is a wearing member that is mounted on a user's head and has a glasses-like shape in this embodiment. The image display unit 20 includes a right support 21, a right display drive unit 22, a left support 23, a left display drive unit 24, a right optical image display unit 26, and a left optical image display unit 28. The right optical image display unit 26 and the left optical image display unit 28 are disposed to be located in front of a user's right and left eyes, respectively, when the user wears the image display unit 20. One end of the right optical image display unit 26 and one end of the left optical image display unit 28 are connected to each other at a position in the middle of the user's forehead when the user wears the image display unit 20.

The right support 21 is a member which extends from an end portion ER which is the other end of the right optical image display unit 26 over a position corresponding to the user's lateral head when the user wears the image display unit 20. Similarly, the left support 23 is a member which extends from an end portion EL which is the other end of the left optical image display unit 28 over a position corresponding to the user's lateral head when the user wears the image display unit 20. The right support 21 and the left support 23 support the image display unit 20 on the user's head like glass temples (temples).

The right display drive unit 22 is disposed inside the right support 21, that is, on a side facing the user's head when the user wears the image display unit 20. The left display drive unit 24 is disposed inside the left support 23. In the following description, the right support 21 and the left support 23 are simply referred to generically as a "support" when both are not distinguished. Similarly, the right display drive unit 22 and the left display drive unit 24 are simply referred to generically as a "display drive unit" when both are not distinguished, and the right optical image display unit 26 and the left optical image display unit 28 are simply referred to generically as an "optical image display unit" when both are not distinguished.

The display drive unit includes liquid crystal displays (hereinafter, referred to as "LCD") 241 and 242 or projection optical systems 251 and 252 (see FIG. 2). The detailed configuration of the display drive unit will be described later. The optical image display unit as an optical member includes light guide plates 261 and 262 (see FIG. 2) and light control plates. The light guide plates 261 and 262 are formed of a light-transmitting resin material and guide image light output from the display drive unit to the user's eyes. The light control plates are thin-plate optical elements and are disposed to cover the front side (the side opposite to the user's eyes) of the image display unit 20. The light control plates protect the light guide plates 261 and 262 and suppress damage or contamination of the light guide plates 261 and 262. By adjusting optical transmittance of the light control plates, it is possible to adjust an amount of external light incident on the user's eyes so as to easily visually recognize a virtual image. The use of the light control plates may be skipped.

The image display unit 20 further includes a connecting section 40 that connects the image display unit 20 to the control unit 10. The connecting section 40 includes a main cord 48 that is connected to the control unit 10, a right cord 42 and a left cord 44 into which the main cord 48 is branched, and a connecting member 46 that is disposed at the branching point. The connecting member 46 is provided with a jack for connection to an earphone plug 30. A right earphone 32 and a left earphone 34 extend from the earphone plug 30.

The image display unit 20 and the control unit 10 transmit various signals via the connecting section 40. An end portion of the main cord 48 opposite to the connecting member 46 and the control unit 10 are provided with connectors (not illustrated) fitted to each other, respectively, and the control unit 10 and the image display unit 20 are connected to or disconnected from each other by fitting/releasing between the connector of the main cord 48 and the connector of the control unit 10. The right cord 42, the left cord 44, and the main cord 48 can employ, for example, a metal cable or an optical fiber.

The control unit 10 is a unit that controls the head-mounted display 100. The control unit 10 includes a lighting unit 12, a touch pad 14, a cross key 16, and a power supply switch 18. The lighting unit 12 notifies the operation state (for example, ON/OFF state of a power source) of the head-mounted display 100 using light-emitting forms thereof. The lighting unit 12 can employ, for example, a light emitting diode (LED). The touch pad 14 detects a touch operation on an operation surface of the touch pad 14 and outputs a signal corresponding to the detected details. The touch pad 14 can employ various touch pads such as an electrostatic type, a pressure detection type, and an optical type. The cross key 16 detects a pressing operation on keys corresponding to upward, downward, rightward, and leftward directions and outputs a signal corresponding to the detected details. The power supply switch 18 switches the power supply state of the head-mounted display 100 by detecting a sliding operation on the switch.

FIG. 2 is a block diagram illustrating a functional configuration of the head-mounted display 100. The control unit 10 includes an input information acquiring unit 110, a storage unit 120, a power supply 130, a wireless communication unit 132, a GPS module 134, a CPU 140, an interface 180, and transmitter units (Tx) 51 and 52. The respective units are connected to each other via a bus not illustrated.

The input information acquiring unit 110 acquires a signal corresponding to an operation input to, for example, the touch pad 14, the cross key 16, or the power supply switch 18. The storage unit 120 is formed of a ROM, a RAM, a DRAM, a hard disk, or the like. The storage unit 120 stores a focal distance table 122. The focal distance table 122 is a table used in a focal distance changing process which is performed by the image processing unit 160. The focal distance changing process is a process of changing a focal distance of an image in a virtual image which is visually recognized by a user of the head-mounted display 100. Details thereof will be described later.

FIG. 3 is a diagram illustrating an example of the focal distance table 122. The focal distance table 122 includes a degree of movement and a focal distance. The degree of movement stores numerals of 0 (pixels) to n (pixels). Here, n is an arbitrary integer. The focal distance stores numerals indicating the focal distance of an image which is visually recognized by a user of the head-mounted display 100 when image light emitted from the display drive unit is moved by the number of pixels stored in the "degree of movement" from an initial state. For example, in the example illustrated in FIG. 3, when the degree of movement is 0 pixels, it can be seen that the focal distance of an image which is visually recognized by the user of the head-mounted display 100 is infinity. When the degree of movement is 1 pixel, it can be seen that the focal distance of the image which is visually recognized by the user is 199 m.

The power supply 130 supplies power to the respective units of the head-mounted display 100. For example, a secondary battery can be used as the power supply 130. The wireless communication unit 132 wirelessly communicates with other devices on the basis of a predetermined wireless communication protocol such as a wireless LAN or a Bluetooth. The GPS module 134 detects its current position by receiving signals from GPS satellites.

The CPU 140 serves as an operating system (OS) 150, an image processing unit 160, a sound processing unit 170, and a display control unit 190 by reading and executing computer programs stored in the storage unit 120.

The image processing unit 160 generates a signal on the basis of contents (image) input via the interface 180 or the wireless communication unit 132. Then, the image processing unit 160 controls the image display unit 20 by supplying the generated signal to the image display unit 20 via the connecting section 40. The signal to be supplied to the image display unit 20 has a difference between an analog format and a digital format. In case of the analog format, the image processing unit 160 generates and transmits a clock signal PCLK, a vertical synchronization signal VSync, a horizontal synchronization signal HSync, and image data Data. Specifically, the image processing unit 160 acquires an image signal included in the contents. For example, when the acquired image signal is a moving image, the acquired image signal is generally an analog signal including 30 frame images per second. The image processing unit 160 separates a synchronization signal such as the vertical synchronization signal VSync or the horizontal synchronization signal HSync from the acquired image signal, and generates the clock signal PCLK through the use of a PLL circuit or the like on the basis of the period of the separated synchronization signal. The image processing unit 160 converts the analog image signal from which the synchronization signal is separated into a digital image signal by the use of an A/D conversion circuit or the like. The image processing unit 160 stores the converted digital image signal as the image data Data of RGB data in the DRAM of the storage unit 120 for each frame. On the other hand, in case of the digital format, the image processing unit 160 generates and transmits the clock signal PCLK and the image data Data. Specifically, when the contents have a digital format, the clock signal PCLK is output in synchronization with the image signal and thus the generation of the vertical synchronization signal VSync and the horizontal synchronization signal HSync and the A/D conversion of the analog image signal are not necessary. The image processing unit 160 may perform various color correcting processes such as a resolution converting process and adjustment of luminance and chroma or image processing such as a ketystone correction process on the image data Data stored in the storage unit 120.

The image processing unit 160 transmits the generated clock signal PCLK, vertical synchronization signal VSync, and horizontal synchronization signal HSync and the image data Data stored in the DRAM of the storage unit 120 via the transmitter units 51 and 52. The image data Data transmitted via the transmitter unit 51 is also referred to as "right-eye image data Data1" and the image data Data transmitted via the transmitter unit 52 is also referred to as "left-eye image data Data2". The transmitter units 51 and 52 serve as transceivers for serial transmission between the control unit 10 and the image display unit 20.

The display control unit 190 generates a control signal for controlling the right display drive unit 22 and the left display drive unit 24. Specifically, the display control unit 190 controls generation and emission of image light from the right display drive unit 22 and the left display drive unit 24 by individually controlling drive ON/OFF of a right LCD 241 by a right LCD control unit 211, drive ON/OFF of a right backlight 221 by a right backlight control unit 201, drive ON/OFF of a left LCD 242 by a left LCD control unit 212, and drive ON/OFF of a left backlight 222 by a left backlight control unit 202 using the control signal. The display control unit 190 transmits the control signals for the right LCD control unit 211 and the left LCD control unit 212 via the transmitter units 51 and 52, respectively. Similarly, the display control unit 190 transmits the control signals for the right backlight control unit 201 and the left backlight control unit 202, respectively.

The sound processing unit 170 acquires a sound signal included in the contents, amplifies the acquired sound signal, and supplies the amplified sound signal to a speaker (not illustrated) in the right earphone 32 connected to the connecting member 46 and a speaker (not illustrated) in the left earphone 34. For example, when a Dolby (registered trademark) system is employed, the sound signal is processed and sounds having, for example, changed frequencies are output from the right earphone 32 and the left earphone 34.

The interface 180 is an interface for connecting various external devices OA as a source of contents to the control unit 10. Examples of the external device OA include a personal computer PC, a mobile phone terminal, and a game terminal. For example, a USB interface, a micro-USB interface, and a memory-card interface can be used as the interface 180.

The image display unit 20 includes a right display drive unit 22, a left display drive unit 24, a right light guide plate 261 as the right optical image display unit 26, a left light guide plate 262 as the left optical image display unit 28, and a 9-axis sensor 66. The 9-axis sensor 66 is a motion sensor that detects accelerations (three axes), angular velocities (three axes), and terrestrial magnetism (three axes).

The right display drive unit 22 includes a receiver unit (Rx) 53, a right backlight (BL) control unit 201 and a right backlight (BL) 221 serving as a light source, a right LCD control unit 211 and a right LCD 241 serving as a display element, and a right projection optical system 251. The right backlight control unit 201, the right LCD control unit 211, the right backlight 221, and the right LCD 241 are also generically referred to as an "image light generating unit".

The receiver unit 53 serves as a receiver for serial transmission between the control unit 10 and the image display unit 20. The right backlight control unit 201 drives the right backlight 221 on the basis of the input control signal. The right backlight 221 is a light-emitting member such as an LED or an electroluminescence (EL). The right LCD control unit 211 drives the right LCD 241 on the basis of the clock signal PCLK, the vertical synchronization signal VSync, the horizontal synchronization signal HSync, and the right-eye image data Data1 which are input via the receiver unit 53. The right LCD 241 is a transmissive liquid crystal panel in which plural pixels are arranged in a matrix shape. The right LCD 241 modulates illumination light emitted from the right backlight 221 to effective image light indicating an image by driving liquid crystal at the pixel positions arranged in the matrix shape to change transmittance of light passing through the right LCD 241. In this embodiment, the backlight type is employed, but image light may be emitted using a front-light type or a reflection type.

The right projection optical system 251 includes a collimator lens that changes the image light emitted from the right LCD 241 to a parallel light beam. The right light guide plate 261 as the right optical image display unit 26 guides the image light output from the right projection optical system 251 to the user's right eye RE while reflecting the image light along a predetermined optical path. The optical image display unit may employ any method as long as it can form a virtual image in front of the user's eyes using image light. For example, a diffraction grating or a transflective film may be used.

The left display drive unit 24 has the same configuration as the right display drive unit 22. That is, the left display drive unit 24 includes a receiver unit (Rx) 54, a left backlight (BL) control unit 202 and a left backlight (BL) 222 serving as a light source, a left LCD control unit 212 and a left LCD 242 serving as a display element, and a left projection optical system 252.

FIG. 4 is a diagram illustrating an example of a virtual image which is visually recognized by a user. FIG. 4 illustrates a user's viewing field VR. As described above, the image light guided to both eyes of the user of the head-mounted display 100 forms an image on the user's retinas, whereby the user visually recognizes a virtual image VI. In the example illustrated in FIG. 4, the virtual image VI is a standby screen of the OS of the head-mounted display 100. The user visually recognizes an external scene SC through the transflective films of the right optical image display unit 26 and the left optical image display unit 28. In this way, the user of the head-mounted display 100 according to this embodiment can view the virtual image VI and the external scene SC in the back of the virtual image VI in a portion of the viewing field VR in which the virtual image VI is displayed. In a portion of the viewing field VR in which the virtual image VI is not displayed, the user can directly view the external scene SC through the optical image display unit.

A-2. Focal Distance Changing Process

FIG. 5 is a flowchart illustrating a flow of a focal distance changing process. The focal distance changing process is a process of changing a focal distance of an image (for example, the standby screen of the OS in the virtual image VI in FIG. 4) in a virtual image which is visually recognized by a user of the head-mounted display 100 and is performed by the image processing unit 160.

The image processing unit 160 determines whether a start trigger of the focal distance changing process is detected (step S102). The start trigger of the focal distance changing process can be arbitrarily determined. For example, activation of the head-mounted display 100, that is, detecting of power ON, may be determined to be the start trigger. For example, a processing start request from the OS 150 or a specific application may be determined to be the start trigger. When the focal distance changing process is called and carried out by a specific application, the focal distance changing process serves as a subroutine of the specific application. When the start trigger of the focal distance changing process is not detected (NO in step S102), the image processing unit 160 continues to detect the start trigger in step S102.

When the start trigger of the focal distance changing process is detected (YES in step S102), the image processing unit 160 acquires a target focal distance (step S104). The "target focal distance" in this embodiment is a target value of the focal distance when the image processing unit 160 changes the focal distance of an image. The target focal distance may be stored in advance, for example, in the storage unit 120. In this case, the image processing unit 160 can acquire the target focal distance by reading out the target focal distance stored in the storage unit 120. When a processing start request from the OS 150 or a specific application is used as the start trigger, the image processing unit 160 may acquire the target focal distance by acquiring an argument supplied along with the processing start request.

After acquiring the target focal distance, the image processing unit 160 calculates a degree of movement of the emission area in the display drive unit (the right display drive unit 22 and the left display drive unit 24) using the focal distance table 122 (step S106). Specifically, the image processing unit 160 searches the "focal distance" of the focal distance table 122 using the target focal distance acquired in step S104 as a key and acquires a value (pixels) stored in the "degree of movement" of the corresponding entry. The "emission area in the display drive unit" will be described later with reference to FIGS. 6 to 9.

After calculating the degree of movement of the emission area, the image processing unit 160 moves the emission area of the display drive unit (the right display drive unit 22 and the left display drive unit 24) using the calculated value (step S108). Details thereof will be described later with reference to FIGS. 6 to 9.

Thereafter, the image processing unit 160 determines whether an end trigger is detected (step S110). The end trigger of the focal distance changing process can be arbitrarily determined. For example, similarly to the start trigger, deactivation of the head-mounted display 100, that is, detecting of power OFF, may be determined to be the end trigger. For example, a processing end request from the OS 150 or a specific application may be determined to be the end trigger. When the end trigger of the focal distance changing process is not detected (NO in step S110), the image processing unit 160 shifts the process to step S104 and acquires the target focal distance again in step S104. On the other hand, when the end trigger of the focal distance changing process is detected (YES step S110), the image processing unit 160 ends the process flow.

FIG. 6 is a diagram illustrating a relationship between the size of the reference area of the display drive unit and the size of the emission area through which image light is actually emitted from the display drive unit. The "reference area of the display drive unit" means an area through which the display drive unit (the right display drive unit 22 and the left display drive unit 24) emits image light in a normal state, that is, an area serving as a reference for causing the display drive unit to emit image light. For example, the reference area may be set to be slightly smaller than the maximum area through which the display drive unit can emit image light or may be set to the maximum area through which the display drive unit can emit image light. Here, the "maximum area through which the display drive unit can emit image light" is defined as the entire area in which liquid crystal is arranged in the right LCD 241 and the left LCD 242 and an area which can be irradiated with illumination light from the right backlight 221 and the left backlight 222, when the display drive unit includes the backlight and the LCD as in this embodiment.

In the example illustrated in FIG. 6, the size of the reference area MA1 in the right display drive unit 22 corresponding to the user's right eye RE is x pixels:y pixels. Similarly, the size of the reference area MA2 in the left display drive unit 24 corresponding to the user's left eye LE is x pixels:y pixels.

In FIG. 6, the area (also referred to as "emission area") through which image light is actually emitted from the display drive unit (the right display drive unit 22 and the left display drive unit 24) is hatched. In this embodiment the emission area is smaller in the horizontal direction (transverse direction) than the reference area. Specifically, the size of the emission area CA1 in the right display drive unit 22 corresponding to the user's right eye RE is x−n pixels:y pixels and is set to be smaller in the horizontal direction than the reference area MA1. Similarly, the size of the emission area CA2 in the left display drive unit 24 corresponding to the user's left eye LE is x−n pixels:y pixels and is set to be smaller in the horizontal direction than the reference area MA2. The "n pixels" of the emission areas CA1 and CA2 is preferably set to be equal to the maximum value of the "degree of movement" in the focal distance table 122 illustrated in FIG. 3.

In the head-mounted display 100 according to this embodiment, the emission area CA1 in the right display drive unit 22 corresponding to the user's right eye RE is arranged at the right end of the reference area MA1 in the initial state. On the other hand, the emission area CA2 in the left display drive unit 24 corresponding to the user's left eye LE is arranged at the left end of the reference area MA2.

In order to emit image light from the emission areas CA1 and CA2 which are parts of the reference areas MA1 and MA2, the image processing unit 160 can use any one of methods 1 and 2 described below.

(1) The image processing unit 160 inserts dot data generated from an image based on contents or the like into the emission area CA1 and inserts dummy dot data of black into an area other than the emission area CA1 when generating right-eye image data Data1. Similarly, the image processing unit 160 inserts dot data generated from an image based on contents or the like into the emission area CA2 and inserts dummy dot data of black into an area other than the emission area CA2 when generating left-eye image data Data2.

(2) The image processing unit 160 operates a signal (Enable signal) for switching validity/invalidity of generation of image light by the image light generating unit (the right LCD 241 and the right backlight 221, the left LCD 242 and the left backlight 222) of the display drive unit. Specifically, the image processing unit 160 outputs a Hi (valid) value for the emission area CA1 and outputs a Lo (invalid) value for the area other than the emission area CA1 in response to the Enable signal transmitted to the transmitter unit 51 along with the right-eye image data Data1. Similarly, the image processing unit 160 outputs a Hi value for the emission area CA2 and outputs a Lo value for the area other than the emission area CA2 in response to the Enable signal transmitted to the transmitter unit 52 along with the left-eye image data Data2.

Since the image data for the emission areas CA1 and CA2 can be set to the image data generated from the same image based on the same contents or the like using methods 1 and 2, it is possible to reduce a calculation load in the image processing unit 160.

FIG. 7 is a diagram illustrating an image which is formed by image light emitted from the display drive unit when the focal distance is infinity. In FIG. 7, in order to distinguish right and left, the images are referenced by the reference signs of the LCDs included in the display drive units. When the target focal distance acquired by the image processing unit 160 in step S104 of the focal distance changing process is "infinity", the degree of movement of the emission area calculated by the image processing unit 160 in step S106 is "0 (pixels)". Accordingly, in step S108, the image processing unit 160 maintains the initial state (FIG. 6) and does not change the emission areas CA1 and CA2 in the display drive units. As a result, the image IM1 which is visually recognized with the user's right eye RE on the basis of the image light emitted from the emission area CA1 and the image IM2 which is visually recognized with the user's left eye LE on the basis of the image light emitted from the emission area CA2 are in a parallel viewing state in which the images are displayed at the positions at which both eyes of the user directly stare at the front side in parallel, thereby realizing the focal distance of infinity (FIG. 7).

FIG. 8 is a diagram illustrating an image which is formed by the image light emitted from the display drive unit when the focal distance is 0.3 m. In FIG. 8, in order to distinguish right and left, the images are referenced by the reference signs of the LCDs included in the display drive units. FIG. 9 is a diagram illustrating a virtual image which is visually recognized by a user when the focal distance is 0.3 m. When the target focal distance acquired by the image processing unit 160 in step S104 of the focal distance changing process is "0.3 (m)", the degree of movement of the emission area calculated by the image processing unit 160 in step S106 is "n (pixels)". Accordingly, in step S108, the image processing unit 160 moves the emission area CA1 in the right display drive unit 22 corresponding to the user's right eye RE and the emission area CA2 in the left display drive unit 24 corresponding to the left eye LE by n pixels in the directions (the directions of white arrows in FIG. 8) directed to the middle of the forehead from the initial state (FIG. 6) in cooperation. As a result, the image IM1 which is visually recognized by the user's right eye RE on the basis of the image light emitted from the emission area CA1 and the image IM2 which is visually recognized by the user's left eye LE on the basis of the image light emitted from the emission area CA2 are focused as an image IM on a position separated by a distance La from the user's eyes. The distance La is substantially equal to the target focal distance and is 0.3 m in this example.

In this way, the image processing unit 160 can change the focal distance La of the image IM in the virtual image VI which is visually recognized by the user of the head-mounted display 100 by moving the emission area CA1 in the right display drive unit 22 corresponding to the user's right eye RE and the emission area CA2 in the left display drive unit 24 corresponding to the left eye LE (FIG. 9). The image processing unit 160 can set the focal distance La of the image IM to the target focal distance acquired in step S104 of the focal distance changing process by calculating the degrees of movement of the emission areas CA1 and CA2 on the basis of the focal distance table 122.

In the above-mentioned focal distance changing process according to the first embodiment, the image processing unit 160 changes the focal distance La of an image in the virtual image VI which is visually recognized by the user by controlling a pair of display drive units (the right display drive unit 22 and the left display drive unit 24) using the emission areas CA1 and CA2 smaller in the horizontal direction than the reference areas MA1 and MA2 so as to move the emission areas CA1 and CA2 in a first direction in which an image formed by the image light emitted from one display drive unit (the right display drive unit 22) and an image formed by the image light emitted from the other display drive unit (the left display drive unit 24) move close to each other in cooperation. Accordingly, the same result as mechanically moving display elements (for example, the backlight and the LCD) corresponding to the user's right and left eyes (the right eye RE and the left eye LE) can be achieved without mechanically moving the constituent members of the head-mounted display device (the head-mounted display 100). Since the convergence angle of the right eye RE and the left eye LE of the user of the head-mounted display 100 with respect to the image appearing in the virtual image can be changed, the user can recognize depth. As a result, by employing the head-mounted display 100 according to this embodiment, it is possible to change the focal distance of an image in a virtual image which is visually recognized by the user without mechanically moving the constituent members of the head-mounted display 100.

According to the focal distance changing process, the image processing unit 160 acquires the target value of the focal distance (step S104), calculates the degree of movement of the emission area from the acquired target value (step S106), and moves the emission areas CA1 and CA2 of image light in a pair of display drive units (the right display drive unit 22 and the left display drive unit 24) on the basis of the calculated degree of movement (step S108). When an image formed by the image light emitted from one display drive unit and an image formed by the image light emitted from the other display drive unit move close to each other in cooperation in the pair of display drive units, the convergence angle of the right eye RE and the left eye LE of the user with respect to the image formed by both of the image light increases. That is, the user of the head-mounted display 100 can recognize the image at a close distance. Therefore, the image processing unit 160 can change the focal distance La of an image on the basis of the target value of the focal distance.

According to the focal distance changing process, the image processing unit 160 sets the emission area CA1 in one display drive unit (the right display drive unit 22) corresponding to the user's right eye RE to the right end of the reference area MA1 and sets the emission area CA2 in the other display drive unit (the left display drive unit 24) to the left end of the reference area MA2. In this way, when the emission areas CA1 and CA2 in the display drive units are set to the left and right ends of the reference areas MA1 and MA2, respectively, in a state where the focal distance of an image is set to infinity, that is, in a parallel viewing state where right and left images are displayed at positions at which both eyes of the user directly stare at the front side in parallel, the image processing unit 160 can change the convergence angle between both eyes (the right eye RE and the left eye LE) of the user and an image by effectively using the entire areas of the reference areas MA1 and MA2.

A-3. First Modification of Focal Distance Changing Process

FIG. 10 is a diagram illustrating a first modification of the focal distance changing process. In FIG. 10, in order to distinguish right and left, the images formed by image light emitted from the display drive unit are referenced by the reference signs of the LCDs included in the display drive units. In the first modification, the image processing unit 160 performs the following processes a1 and a2 instead of steps S106 and S108 when the target focal distance acquired in step S104 of the focal distance changing process (FIG. 5) is "infinity".

(a1) The emission areas CA1 and CA2 in the display drive units are made to be equal to the reference areas MA1 and MA2. Specifically, the size of the emission area CA1 of the right display drive unit 22 corresponding to the user's right eye RE is set to x pixels:y pixels similarly to the reference area MA1. Similarly, the size of the emission area CA2 of the left display drive unit 24 corresponding to the user's left eye LE is set to the same x pixels:y pixels similarly as the reference area MA2. The emission areas CA1 and CA2 are arranged at the centers of the reference areas MA1 and MA2.

(a2) Without performing the insertion of dummy dot data described in method 1 and performing the operation of the Enable signal described in method 2, the right-eye image data Data1 and the left-eye image data Data2 are generated on the basis of the dot data generated from an image based on contents or the like. This is because the emission areas CA1 and CA2 are equal to the reference areas MA1 and MA2.

The image processing unit 160 performs the processes described in steps S106 and S108 when the target focal distance acquired in step S104 of the focal distance changing process (FIG. 5) is "infinity".

In this case, the image IM1 which is visually recognized by the user's right eye RE on the basis of the image light emitted from the emission area CA1 and the image IM2 which is visually recognized by the user's left eye LE on the basis of the image light emitted from the emission area CA2 are in a parallel viewing state in which the images are displayed at positions at which both eyes of the user directly stare at the front side in parallel, thereby realizing the focal distance of infinity (FIG. 10).

As described above, according to the first modification of the focal distance changing process according to the first embodiment, the image processing unit 160 sets the sizes of the emission areas CA1 and CA2 to the same sizes as the reference areas MA1 and MA2. When the sizes of the emission areas of the image light are made to be equal to the sizes of the reference areas of the display drive units, the image processing unit can increase the size of an image displayed as a virtual image VI.

A-4. Second Modification of Focal Distance Changing Process

FIG. 11 is a diagram illustrating a second modification of the focal distance changing process. In FIG. 11, in order to distinguish right and left, the images formed by image light emitted from the display drive unit are referenced by the reference signs of the LCDs included in the display drive units. The focal distance changing process according to the second modification is different from the focal distance changing process described with reference to FIG. 5, in the positions of the emission areas CA1 and CA2 in the initial state and details stored in the focal distance table 122.

As illustrated in FIG. 11, in the head-mounted display 100 according to the second modification example, the emission area CA1 in the right display drive unit 22 corresponding to the user's right eye RE is arranged at the center of the reference area MA1 in the initial state. Similarly, the emission area CA2 in the left display drive unit 24 corresponding to the user's left eye LE is arranged at the center of the reference area MA2.

FIG. 12 is a diagram illustrating an example of the focal distance table 122 used in the focal distance changing process according to the second modification. Numerals of −n/2 (pixels) to n/2 (pixels) are stored in the degree of movement. Here, n is an arbitrary integer. Numerals representing the focal distance of an image which is visually recognized by a user of the head-mounted display 100 when image light emitted from the display drive unit is moved by the number of pixels stored in the "degree of movement" from the initial state are stored in the focal distance. For example, in the example illustrated in FIG. 12, it can be seen that when the degree of movement is −n/2 pixels, the focal distance of the image which is visually recognized by the user of the head-mounted display 100 is infinity. In addition, it can be seen that the focal distance of the image which is visually recognized by the user is 95 m when the degree of movement is 0 pixels, and that the focal distance of the image which is visually recognized by the user is 1 m when the degree of movement is n/2 pixels.

The processes of the image processing unit 160 in the focal distance changing process according to the second modification are the same as described with reference to FIG. 5. In step S108, the image processing unit 160 performs the following procedures b1 and b2.

(b1) When the degree of movement calculated from the focal distance table 122 has a positive value, the emission areas CA1 and CA2 are moved in a first direction D1 (FIG. 11) in which an image formed by image light emitted from the right display drive unit 22 and an image formed by image light emitted from the left display drive unit 24 move close to each other in cooperation.

(b2) When the degree of movement calculated from the focal distance table 122 has a negative value, the emission areas CA1 and CA2 are moved in a second direction D2 (FIG. 11) in which an image formed by image light emitted from the right display drive unit 22 and an image formed by image light emitted from the left display drive unit 24 move apart from each other in cooperation.

In this case, the image processing unit 160 can change the focal distance of an image in a virtual image which is visually recognized by the user of the head-mounted display 100 by moving the emission area CA1 in the right display drive unit 22 corresponding to the user's right eye RE and the emission area CA2 in the left display drive unit 24 corresponding to the left eye LE. The image processing unit 160 can set the focal distance of an image to the target focal distance acquired in step S104 of the focal distance changing process (FIG. 5) by calculating the degrees of movement of the emission areas CA1 and CA2 on the basis of the focal distance table 122.

As described above, according to the second modification of the focal distance changing process according to the first embodiment, the focal distance of an image in a virtual image which is visually recognized by the user of the head-mounted display 100 is changed by controlling a pair of display drive units so as to move the emission areas CA1 and CA2 in any one of the first direction D1 in which an image formed by image light emitted from one display drive unit (the right display drive unit 22) and an image formed by image light emitted from the other display drive unit (the left display drive unit 24) move close to each other in cooperation and the second direction D2 in which an image formed by image light emitted from the right display drive unit 22 and an image formed by image light emitted from the left display drive unit 24 move apart from each other in cooperation. In this case, it is also possible to achieve the same advantages as the focal distance changing process according to the first embodiment.

B. Second Embodiment

B-1. Configuration of Head-Mounted Display Device

In a second embodiment of the invention, a configuration capable of changing the focal distance of an image depending on a distance to an object present in front of both eyes of a user of the head-mounted display device will be described. Only elements having configurations and operations different from those in the first embodiment will be described below. The same elements in the drawings as in the first embodiment will be referenced by the same reference signs as in the first embodiment and detailed description thereof will not be repeated.

FIG. 13 is a block diagram illustrating a functional configuration of a head-mounted display 100*a* according to the second embodiment. The head-mounted display according to this embodiment is different from the head-mounted display according to the first embodiment illustrated in FIG. 2, in that the control unit 10 is replaced with a control unit 10*a* and the image display unit 20 is replaced with an image display unit 20*a*. The control unit 10*a* includes an image processing unit 160*a* instead of the image processing unit 160. The image processing unit 160*a* is different from the image processing unit in the first embodiment, in processing details of the focal distance changing process (FIG. 5). Details thereof will be described later.

The image display unit 20*a* includes a distance measuring unit 61 in addition to the units described in the first embodiment. The distance measuring unit 61 is disposed at a position corresponding to the middle of a user's forehead when the user wears the head-mounted display 100*a* and has a function of measuring a distance to an object present in front of the user's eyes. The distance measuring unit 61 can be embodied, for example, by a combination of a camera and an image analysis module. The camera is a visible-ray camera that captures an external scene (outside scene) in the front direction of the image display unit 20a, that is, in the user's viewing direction when the user wears the head-mounted display 100a and acquires an external scene image. The image analysis module recognizes the external scene image acquired with the camera and calculates the distance to an object included in the external scene image. The distance measuring unit 61 may be embodied by a distance sensor for acquiring a distance between an object in the user's viewing direction and the image display unit 20a using reflected light.

B-2. Focal Distance Changing Process

The focal distance changing process according to the second embodiment is almost the same as in the first embodiment illustrated in FIG. 5. In step S104, the image processing unit 160a acquires the distance measured by the distance measuring unit 61 as the "target focal distance". The other steps are the same as described with reference to FIG. 5.

As described above, in the focal distance changing process according to the second embodiment, the image processing unit 160a can change the focal distance La of an image in a virtual image VI which is visually recognized by a user depending on the distance to an object present in front of the eyes of the user of the head-mounted display 100a.

B-3. First Modification of Focal Distance Changing Process

The first modification of the focal distance changing process according to the second embodiment is the same as in the first embodiment.

B-4. Second Modification of Focal Distance Changing Process

The second modification of the focal distance changing process according to the second embodiment is the same as in the first embodiment.

C. Third Embodiment

In a third embodiment of the invention, a configuration capable of changing the focal distance of an image only when a predetermined marker is present in front of both eyes of a user of the head-mounted display device will be described. Only elements having configurations and operations different from those in the first embodiment will be described below. The same elements in the drawings as in the first embodiment will be referenced by the same reference signs as in the first embodiment and detailed description thereof will not be repeated.

C-1. Configuration of Head-Mounted Display Device

FIG. 14 is a block diagram illustrating a functional configuration of a head-mounted display 100b according to the third embodiment. The head-mounted display according to this embodiment is different from the head-mounted display according to the first embodiment illustrated in FIG. 2, in that the control unit 10 is replaced with a control unit 10b and the image display unit 20 is replaced with an image display unit 20b. The control unit 10b includes an image processing unit 160b instead of the image processing unit 160. The image processing unit 160b is different from the image processing unit in the first embodiment, in processing details of the focal distance changing process (FIG. 5). Details thereof will be described later.

The image display unit 20b includes a marker detecting unit 62 in addition to the units described in the first embodiment. The marker detecting unit 62 is disposed at a position corresponding to the middle of a user's forehead when the user wears the head-mounted display 100b and has a function of detecting presence of a predetermined marker (marker) present in front of the user's eyes. The marker detecting unit 62 can be embodied, for example, by a combination of a camera and an image analysis module. The camera is a visible-ray camera that captures an external scene in the front direction of the image display unit 20b, that is, in the user's viewing direction when the user wears the head-mounted display 100b and acquires an external scene image. The image analysis module recognizes the external scene image acquired with the camera and determines whether a predetermined marker is present therein.

C-2. Focal Distance Changing Process

The focal distance changing process according to the third embodiment is almost the same as in the first embodiment illustrated in FIG. 5. In step S102, the image processing unit 160b uses detection of presence of a predetermined marker by the marker detecting unit 62 as the start trigger. The other steps are the same as described with reference to FIG. 5.

As described above, in the focal distance changing process according to the third embodiment, the image processing unit 160b can change the focal distance La of an image in a virtual image VI which is visually recognized by a user only when a predetermined marker is present in front of the eyes of the user of the head-mounted display 100b. As a result, for example, only when markers installed in the vicinity of articles on exhibition in facilities such as art galleries, museums, amusement parks, and theaters are detected, the aspect of use of changing the focal distance of an image can be implemented.

C-3. First Modification of Focal Distance Changing Process

The first modification of the focal distance changing process according to the third embodiment is the same as in the first embodiment.

C-4. Second Modification of Focal Distance Changing Process

The second modification of the focal distance changing process according to the third embodiment is the same as in the first embodiment.

D. Modification Examples

In the above-mentioned embodiments, a part of elements embodied by hardware may be replaced with software, or a part of elements embodied by software may be replaced with hardware. In addition, the following modifications can be considered.

Modification Example 1

The above-mentioned embodiments describe the configuration of the head-mounted display. However, the configuration of the head-mounted display can be arbitrarily determined without departing from the gist of the invention, and for example, the elements may be added, deleted, changed, and the like.

In the above-mentioned embodiments, allocation of elements to the control unit and the image display unit is only an example and various aspects can be employed. For example, the following aspects may be considered: (i) an aspect in which the control unit is provided with processing functions of a CPU or a memory and the image display unit is provided with only a display function; (ii) an aspect in which both the control unit and the image display unit are provided with the processing functions of the CPU or the memory; (iii) an aspect in which the control unit and the image display unit are incorporated into a single unit (for example, an aspect in which the image display unit includes the control unit and the whole configuration serves as a glasses-like wearable computer); (iv) an aspect in which a smart phone or a portable game machine is used instead of the control unit; and (v) an aspect in which the control unit and the image display unit are configured to wirelessly communicate with each other or to be supplied with power in a wireless manner and thus the connecting section (cord) is made unnecessary.

The above-mentioned embodiments describe the configuration in which the control unit includes the transmitter unit and the image display unit includes the receiver unit, for the purpose of convenience of explanation. However, the transmitter unit and the receiver unit in the above-mentioned embodiments may have a bidirectional communication function and may serve as a transceiver unit. For example, the control unit illustrated in FIG. 2 is connected to the image display unit via a wired signal transmission line. However, the control unit and the image display unit may be connected to each other via a wireless signal transmission line such as a wireless LAN, infrared communication, or Bluetooth (registered trademark).

For example, the configurations of the control unit and the image display unit illustrated in FIG. 2 can be arbitrarily modified. Specifically, for example, the touch pad may be removed from the control unit and the operation may be carried out using only the cross key. The control unit may be provided with another operation interface such as an operational stick. The control unit may be configured to be connected to a device such as a keyboard or a mouse and may receive an input from the keyboard or the mouse. For example, an operation input using a foot switch (a switch operated with a user's foot) may be acquired in addition to the operation inputs using the touch pad and the cross key. For example, the image display unit may be provided with a sight line detecting unit such as an infrared sensor, a user's sight line may be detected, and an operation input based on a command correlated with the movement of the sight line may be acquired. For example, a user's gesture may be detected using a camera and an operation input based on a command correlated with the detected gesture may be acquired. At the time of detecting the gesture, a user's finger tip, a ring worn on a user's finger, a medical instrument grasped by a user's hand, or the like may be moved and may be used as a mark for detection. When the operation input using the foot switch or the sight line can be acquired, the input information acquiring unit can acquire an operation input from a user even in an operation in which it is difficult to release a hand.

For example, the head-mounted display is described above as a binocular type transmissive head-mounted display, but a monocular type head-mounted display may be employed. A non-transmissive head-mounted display that blocks an external scene in a state where a user wears the head-mounted display may be employed.

FIGS. 15A and 15B are diagrams illustrating an outer configuration of a head-mounted display according to a modification example. In the example illustrated in FIG. 15A, the head-mounted display according to the modification example is different from the head-mounted display 100 illustrated in FIG. 1, in that an image display unit 20c includes a right optical image display unit 26c instead of the right optical image display unit 26 and includes a left optical image display unit 28c instead of the left optical image display unit 28. The right optical image display unit 26c is formed with a size smaller than the optical member according to the first embodiment and is disposed on the oblique upper side of a user's right eye in a state where the user wears the head-mounted display. Similarly, the left optical image display unit 28c is formed with a size smaller than the optical member according to the first embodiment and is disposed on the oblique upper side of a user's left eye in a state where the user wears the head-mounted display. In the example illustrated in FIG. 15B, the head-mounted display according to the modification example is different from the head-mounted display 100 illustrated in FIG. 1, in that an image display unit 20d includes a right optical image display unit 26d instead of the right optical image display unit 26 and includes a left optical image display unit 28d instead of the left optical image display unit 28. The right optical image display unit 26d is formed with a size smaller than the optical member according to the first embodiment and is disposed on the oblique lower side of a user's right eye in a state where the user wears the head-mounted display. Similarly, the left optical image display unit 28d is formed with a size smaller than the optical member according to the first embodiment and is disposed on the oblique lower side of a user's left eye in a state where the user wears the head-mounted display. In this way, the optical image display unit has only to be disposed in the vicinity of the user's eyes. The size of the optical member constituting the optical image display unit is not limited, and a head-mounted display of an aspect in which the optical image display unit covers a part of the user's eye, that is, an aspect in which the optical image display unit does not fully cover the user's eyes, may be embodied.

For example, it is described above that the functional units such as the image processing unit, the display control unit, and the sound processing unit are embodied by causing the CPU to develop a computer program stored in a ROM or a hard disk into a RAM and to execute the developed computer program. However, the functional units may be embodied by an application specific integrated circuit (ASIC) designed to perform the functions.

For example, the above-mentioned embodiments describe that the image display unit is a head-mounted display which is mounted like a pair of glasses, but the image display unit may be a general panel display device (such as a liquid crystal display device, a plasma display device, and an organic EL display device). In this case, the control unit and the image display unit may be connected to each other via a wired signal transmission line or via a wireless signal transmission line. By employing this configuration, the control unit may be used as a remote controller of a general panel display device.

An image display unit having a different shape such as an image display unit which is mounted like a hat may be employed as the image display unit instead of the image display unit which is mounted like a pair of glasses. The earphone may be of an ear hook type or of a head band type or may be skipped. For example, the image display unit may be embodied as a head-up display (HUD) mounted on a vehicle such as an automobile or an airplane. For example, the image display unit may be embodied as a head-mounted display built into a body protecting instrument such as a helmet.

For example, the above-mentioned embodiments describe that a secondary battery is used as the power supply, but the power supply is not limited to the secondary battery and various batteries may be used. For example, a primary battery, a fuel cell battery, a solar cell battery, and a thermal battery may be used.

For example, the above-mentioned embodiments describe that the display drive unit includes the backlight, the backlight control unit, the LCD, the LCD control unit, and the projection optical system. However, this configuration is only an example. The display drive unit may include a constituent unit for embodying another scheme in addition the constituent units or instead of the constituent units. For example, the display drive unit may include an organic electroluminescence (EL) display an organic EL control unit, and a projection optical system. For example, the display drive unit may include a digital micromirror device (DMD) instead of the LCD. For example, the display drive unit may include color light sources for generating RGB color light, a signal light modulating unit including a relay lens, a scanning optical system including an MEMS mirror, and a drive control circuit for driving these units. When an organic LE, a DMD, or a MEMS mirror is used in this way, the "emission area in the display drive unit" is an area through which image light is actually emitted from the display drive unit and the same advantages as described in the above-mentioned embodiments can be achieved by controlling the emission area in each device (display drive unit) as described in the above-mentioned embodiments. For example, the display drive unit may include one or more lasers emitting a laser beam having intensity corresponding to an image signal to a user's retinas. In this case, the "emission area in the display drive unit" is also an area through which a laser beam indicating an image is actually emitted from the display drive unit. The same advantages as described in the above-mentioned embodiments can be achieved by controlling the emission area of the laser beam in the laser (display drive unit) as described in the above-mentioned embodiments.

Modification Example 2

The above-mentioned embodiments describe an example of the focal distance changing process. However, the flow of the focal distance changing process is only an example and can be modified in various forms. For example, some steps may be skipped or another step may be added thereto. The order of the steps to be performed may be changed.

For example, in step S104 of the focal distance changing process according to the second embodiment, the image processing unit may acquire a distance between an object present at an end of the user's sight line and the image display unit as the "target focal distance". Specifically, the image display unit may include a sight line detecting unit that detects the direction of the user's sight line. The sight line detecting unit can be embodied, for example, by an infrared light sensor, a camera imaging the user's eyes, or the like. The image analysis module of the distance measuring unit recognizes an external scene image acquired with the camera and calculates the distance to an object appearing in the external scene image and being present in the direction of the sight line detected by the sight line detecting unit. Accordingly, the image processing unit can change the focal distance of an image using the distance to an object present in the direction of the sight line of the user of the head-mounted display.

For example, in step S104 of the focal distance changing process according to the third embodiment, the image processing unit may acquire a distance between a user of the head-mounted display and a predetermined marker present in front of the user's eyes as the "target focal distance". Specifically, the marker detecting unit is configured to detect presence of a predetermined marker present in front of the user's eyes and to measure the distance from the user to the predetermined marker. For example, the image analysis module of the marker detecting unit recognizes an external scene image acquired with the camera and calculates the distance to the predetermined marker appearing in the external scene image. Accordingly, the image processing unit can change the focal distance of an image using the distance to the predetermined marker present in front of the eyes of the user of the head-mounted display.

For example, in step S102 of the focal distance changing process according to the first to third embodiments, the image processing unit may set the start trigger of the focal distance changing process to satisfaction of any one of the following conditions. In this case, the image display unit includes the sight line detecting unit that detects the direction of the user's sight line. The sight line detecting unit can be embodied, for example, by an infrared light sensor or a camera imaging a user's eyes.

A condition that the direction of the detected sight line is in a range of viewing angle of about 200 degrees horizontally and about 125 degrees vertically (for example, 75 degrees downward and 50 degrees upward)

A condition that the direction of the detected sight line is in a range of viewing angle of about 30 degrees horizontally and about 20 degrees vertically as an effective viewing field in which information acceptance capability is excellent A condition that the direction of the detected sight line is in a range of viewing angle of about 60 to 90 degrees horizontally and about 45 to 70 degrees vertically as a stable field of fixation in which a point of regard is rapidly and stably viewed A condition that the direction of the detected sight line is in a range of viewing angle of from about 20 degrees horizontally at which self-motion perception (vection) induced in an image starts to about 110 degrees at which the self-motion perception is saturated Modification Example 3

The above-mentioned embodiments describe an example of the focal distance table. However, the details of the focal distance table are only an example and can be modified in various forms. For example, a field may be added, deleted, or changed. The focal distance table may be divided into plural tables and normalized.

For example, the degree of movement may be expressed by a unit other than pixels. The focal distance may be expressed by a unit other than meters.

The use of the focal distance table may be skipped. When the use of the focal distance table is skipped, the image processing unit can acquire the degree of movement by calculation.

Modification Example 4

The invention is not limited to the above-mentioned embodiments, examples, and modification examples, but can be modified in various forms without departing from the gist of the invention. For example, the technical features of the embodiments, the examples, and the modification examples corresponding to the technical features of the aspects described in the summary of invention can be appropriately exchanged or combined in order to solve all or a part of the above-mentioned problems or to achieve all or a part of the above-mentioned effects. The technical features can be appropriately deleted when the technical features are not described to be essential in the specification.

REFERENCE SIGNS LIST

10: control unit (controller)
12: lighting unit
14: touch pad
16: cross key
18: power supply switch
20: image display unit
21: right support
22: right display drive unit
23: left support
24: left display drive unit
26: right optical image display unit
28: left optical image display unit
30: earphone plug
32: right earphone
34: left earphone
40: connecting section
42: right cord
44: left cord
46: connecting member
48: main cord
51: transmitter unit
52: transmitter unit
53: receiver unit (display drive unit)
54: receiver unit (display drive unit)
61: distance measuring unit
62: marker detecting unit
110: input information acquiring unit
100: head-mounted display (head-mounted display device)
120: storage unit
122: focal distance table
130: power source
140: CPU
160: image processing unit
170: sound processing unit
180: interface
190: display control unit
201: right backlight control unit (display drive unit)
202: left backlight control unit (display drive unit)
211: right LCD control unit (display drive unit)
212: left LCD control unit (display drive unit)
221: right backlight (display drive unit)
222: left backlight (display drive unit)
241: right LCD (display drive unit)
242: left LCD (display drive unit)
251: right projection optical system (display drive unit)
252: left projection optical system (display drive unit)
261: right light guide plate
262: left light guide plate
PCLK: clock signal
VSync: vertical synchronization signal
HSync: horizontal synchronization signal
Data: image data
Data1: right-eye image data
Data2: left-eye image data
OA: external device
PC: personal computer
SC: external scene
RE: right eye
LE: left eye
VI: virtual image
EL: end portion
AP: tip portion
ER: end portion
VR: viewing region
La: focal distance
MA1: reference area
CA1: emission area
MA2: reference area
CA2: emission area
IM: image
IM1: image
IM2: image

The invention claimed is:

1. A head-mounted display device that enables a user to visually recognize a virtual image and an external scene, comprising:
a pair of display drive units that generates and emits image light representing an image; and
an image processing unit that controls the display drive units so as to emit the image light from emission areas of the display drive units,
wherein the image processing unit controls the pair of display drive units so as to move the emission areas in any one of a first direction in which an image formed by the image light emitted from one of the display drive units and an image formed by the image light emitted from the other of the display drive units move close to each other in cooperation and a second direction in which an image formed by the image light emitted from one of the display drive units and an image formed by the image light emitted from the other of the display drive units move apart from each other in cooperation to change a focal distance of an image in a virtual image which is visually recognized by the user,
wherein the emission areas are areas through which image light is actually emitted than a reference area through which the respective display drive unit emits image light in a normal state, the emission areas being larger than respective ones of the images formed by the respective display drive units.

2. The head-mounted display device according to claim 1, wherein the image processing unit controls the pair of display drive units so as to move the emission areas in the first direction to change the focal distance of the image in the virtual image which is visually recognized by the user.

3. The head-mounted display device according to claim 1, wherein the image processing unit controls the pair of display drive units so as to move the emission areas in the first direction to change the focal distance of the image in the virtual image which is visually recognized by the user.

4. The head-mounted display device according to claim 3, further comprising a distance measuring unit that measures a distance from the user to an object present in front of the user's eyes,
wherein the image processing unit acquires the measured distance as the target value.

5. The head-mounted display device according to claim 3, wherein the image processing unit controls the pair of display drive units so as to set the emission area of the one display drive unit to a right end of the reference area and to set the emission area of the other display drive unit to a left end of the reference area to set the focal distance of the image in the virtual image which is visually recognized by the user to infinity.

6. The head-mounted display device according to claim 3, wherein the image processing unit controls the pair of display drive units so as to set a size of the emission area to the same size of the reference area and to set the emission areas of the pair of display drive units to the center of the reference area to set the focal distance of the image in the virtual image which is visually recognized by the user to infinity.

7. The head-mounted display device according to claim 1, wherein the image processing unit acquires a target value of the focal distance, calculates a degree of movement of the emission areas from the acquired target value, and moves the emission area of the one display drive unit and the emission area of the other display drive unit on the basis of the calculated degree of movement.

8. The head-mounted display device according to claim 7, further comprising a sight line detecting unit that detects a direction of the user's sight line, wherein the distance measuring unit measures a distance to the object present in the direction of the detected sight line.

9. The head-mounted display device according to claim 1, further comprising a marker detecting unit that detects a predetermined marker present in front of the user's eyes, wherein the image processing unit changes the focal distance of the image when the predetermined marker is detected.

10. The head-mounted display device according to claim 9, wherein the predetermined marker is installed on an article external with respect to the head-mounted display device.

11. A control method of a head-mounted display device that includes a pair of display drive units generating and emitting image light representing an image and that enables a user to visually recognize a virtual image and an external scene, comprising:

(a) controlling the pair of display drive units so as to emit the image light from emission areas of the display drive units, wherein the controlling (a) includes controlling the pair of display drive units so as to move the emission areas in any one of a first direction in which an image formed by the image light emitted from one of the display drive units and an image formed by the image light emitted from the other of the display drive units move close to each other in cooperation and a second direction in which an image formed by the image light emitted from one of the display drive units and an image formed by the image light emitted from the other of the display drive units move apart from each other in cooperation to change a focal distance of an image in a virtual image which is visually recognized by the user, and wherein the emission areas are areas through which image light is actually emitted from respective display drive units, the emission areas being smaller in a horizontal direction than a reference area through which the respective display drive unit emits image light in a normal state, the emission areas being larger than respective ones of the images formed by the respective display units.

* * * * *